United States Patent
Kubo et al.

(10) Patent No.: US 11,029,497 B2
(45) Date of Patent: *Jun. 8, 2021

(54) CURABLE COMPOSITION, CURED PRODUCT THEREOF, OPTICAL MEMBER AND OPTICAL DEVICE

(71) Applicant: DAICEL CORPORATION, Osaka (JP)

(72) Inventors: Takashi Kubo, Himeji (JP); Hiroki Takenaka, Himeji (JP)

(73) Assignee: DAICEL CORPORATION, Osaka (JP)

(*) Notice: Subject to any disclaimer, the term of this patent is extended or adjusted under 35 U.S.C. 154(b) by 120 days.

This patent is subject to a terminal disclaimer.

(21) Appl. No.: 16/001,223

(22) Filed: Jun. 6, 2018

(65) Prior Publication Data

US 2018/0284396 A1 Oct. 4, 2018

Related U.S. Application Data

(63) Continuation of application No. 14/424,935, filed as application No. PCT/JP2013/072350 on Aug. 22, 2013, now Pat. No. 10,018,810.

(30) Foreign Application Priority Data

Aug. 31, 2012 (JP) .................. 2012-192633
Aug. 31, 2012 (JP) .................. 2012-192634

(51) Int. Cl.
| | |
|---|---|
| G02B 13/00 | (2006.01) |
| C08G 59/24 | (2006.01) |
| C08G 59/32 | (2006.01) |
| C08G 59/22 | (2006.01) |
| C08G 59/02 | (2006.01) |
| C08G 59/30 | (2006.01) |
| G02B 1/04 | (2006.01) |
| B29D 11/00 | (2006.01) |
| B29C 39/02 | (2006.01) |
| B29K 63/00 | (2006.01) |
| B29K 83/00 | (2006.01) |

(52) U.S. Cl.
CPC .... *G02B 13/0085* (2013.01); *B29D 11/00365* (2013.01); *C08G 59/02* (2013.01); *C08G 59/226* (2013.01); *C08G 59/24* (2013.01); *C08G 59/306* (2013.01); *C08G 59/3218* (2013.01); *C08G 59/3281* (2013.01); *G02B 1/041* (2013.01); *B29C 39/02* (2013.01); *B29K 2063/00* (2013.01); *B29K 2083/00* (2013.01)

(58) Field of Classification Search
CPC ...... G02B 13/0085; G02B 1/041; G02B 1/04; B29D 11/00365; B29C 39/02; B29K 2063/00; B29K 2083/00; C08G 59/226; C08G 59/24; C08G 59/306; C08G 59/3218; C08G 59/3281; C08G 59/20; C08G 77/445; C08G 59/02; C08G 59/245; C08G 59/687; C08G 77/18; C08L 63/00; C08L 2201/02; C08L 2201/10; C08L 83/04; C08L 83/06
USPC .......... 525/525, 29, 543, 588; 524/543, 512; 523/400; 359/793
See application file for complete search history.

(56) References Cited

U.S. PATENT DOCUMENTS

| | | | |
|---|---|---|---|
| 5,124,375 | A | 6/1992 | Leibfried |
| 5,863,970 | A | 1/1999 | Ghoshal et al. |
| 6,204,311 | B1 | 3/2001 | Morijiri et al. |
| 7,688,531 | B1 | 3/2010 | Deng et al. |
| 8,575,227 | B2 | 11/2013 | Higo et al. |
| 2001/0002413 | A1 | 5/2001 | Morijiri et al. |
| 2001/0041784 | A1 | 11/2001 | Amagai et al. |
| 2002/0002212 | A1 | 1/2002 | Weinmann et al. |
| 2002/0019511 | A1 | 2/2002 | Morijiri et al. |

(Continued)

FOREIGN PATENT DOCUMENTS

| | | |
|---|---|---|
| CN | 102344544 A | 2/2012 |
| EP | 0 942 027 A2 | 9/1999 |

(Continued)

OTHER PUBLICATIONS

International Search Report issued in PCT/JP2013/072350, dated Sep. 24, 2013.
Crivello, J.V. et al., "The synthesis, characterization, and photoinitiated cationic polymerization of silicon-containing epoxy resins", V. 28, Issue 3, pp. 479-503, Feb. 1990.
Extended European Search Report dated Apr. 15, 2016, in European Patent Application No. 13832700.2.
Extended European Search Report for application No. 19183001.7, dated Oct. 2, 2019.

*Primary Examiner* — Travis S Fissel
(74) *Attorney, Agent, or Firm* — Birch, Stewart, Kolasch & Birch, LLP

(57) ABSTRACT

An object of the present invention is to provide a curable composition that can be cured satisfactorily and can form a cured product having a high glass transition temperature as maintained and having high mechanical strength. A curable composition includes a siloxane (A), a cycloaliphatic epoxide (B), and a curing agent (C). The siloxane (A) contains at least two epoxy groups per molecule. The cycloaliphatic epoxide (B) in the curable composition is preferably a compound represented by Formula (I):

[Chem. 1]

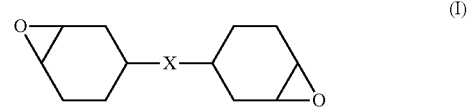

(I)

wherein X is selected from a single bond and a linkage group.

20 Claims, No Drawings

(56) References Cited

U.S. PATENT DOCUMENTS

| | | |
|---|---|---|
| 2003/0032729 A1 | 2/2003 | Takai et al. |
| 2004/0076391 A1 | 4/2004 | Ghoshal et al. |
| 2005/0170187 A1* | 8/2005 | Ghoshal ............... C08G 59/22 428/413 |
| 2008/0058443 A1* | 3/2008 | Moszner ............... A61K 6/30 523/116 |
| 2008/0085962 A1 | 4/2008 | Simone et al. |
| 2008/0085985 A1 | 4/2008 | Nakamura et al. |
| 2008/0113283 A1 | 5/2008 | Ghoshal et al. |
| 2009/0225640 A1 | 9/2009 | Manabe et al. |
| 2010/0044615 A1 | 2/2010 | Lange et al. |
| 2010/0079642 A1 | 4/2010 | Kurimoto et al. |
| 2010/0249341 A1* | 9/2010 | Sato ..................... C07D 303/04 525/523 |
| 2010/0314591 A1* | 12/2010 | Roitman ............... C08F 220/18 252/589 |
| 2011/0018151 A1* | 1/2011 | Watanabe ........ B29D 11/00307 264/2.5 |
| 2011/0111256 A1 | 5/2011 | Hara et al. |
| 2011/0204531 A1 | 8/2011 | Hara et al. |
| 2011/0237766 A1 | 9/2011 | Maggio et al. |
| 2012/0010320 A1 | 1/2012 | Higo et al. |
| 2012/0070594 A1* | 3/2012 | Carlson ................. C08G 18/68 428/35.7 |
| 2012/0218455 A1 | 8/2012 | Imai et al. |

FOREIGN PATENT DOCUMENTS

| | | |
|---|---|---|
| EP | 0 978 513 A1 | 2/2000 |
| EP | 2 039 692 A1 | 3/2009 |
| JP | 2000-109478 A | 4/2000 |
| JP | 2000-230050 A | 8/2000 |
| JP | 2004-352771 A | 12/2004 |
| JP | 2006-307128 A | 11/2006 |
| JP | 2008-31424 A | 2/2008 |
| JP | 2008-133439 A | 6/2008 |
| JP | 2008-189698 A | 8/2008 |
| JP | 2009-204805 A | 9/2009 |
| JP | 2010-102312 A | 5/2010 |
| JP | 2010-105229 A | 5/2010 |
| JP | 2010-173196 A | 8/2010 |
| JP | 2011-1401 A | 1/2011 |
| JP | 2011-52116 A | 3/2011 |
| JP | 2011-132416 A | 7/2011 |
| JP | 2011-138089 A | 7/2011 |
| JP | 2012-116989 A | 6/2012 |
| WO | WO 98/33645 A1 | 8/1998 |
| WO | WO 2012/093589 A1 | 7/2012 |
| WO | WO 2013/011832 A1 | 1/2013 |

\* cited by examiner

US 11,029,497 B2

CURABLE COMPOSITION, CURED PRODUCT THEREOF, OPTICAL MEMBER AND OPTICAL DEVICE

CROSS REFERENCE TO RELATED APPLICATIONS

This application is a Continuation of copending application Ser. No. 14/424,935, filed on Feb. 27, 2015, which was filed as PCT International Application No. PCT/JP2013/072350 on Aug. 22, 2013, which claims the benefit under 35 U.S.C. § 119(a) to Patent Application No. 2012-192633, filed in Japan on Aug. 31, 2012, and Patent Application No. 2012-192634, filed in Japan on Aug. 31, 2012, all of which are hereby expressly incorporated by reference into the present application.

TECHNICAL FIELD

The present invention relates to curable compositions each including a siloxane and a cycloaliphatic epoxide. The present invention also relates to cured products of the curable compositions, compositions for optical element formation, and optical elements and optical devices obtained using the compositions for optical element formation.

The present invention also relates to curable compositions suitable for wafer-level lens preparation (curable composition for a wafer-level lens), and wafer-level lenses and optical devices obtained using the curable composition for a wafer-level lens.

BACKGROUND ART

Glass materials have been used in application fields such as lenses, prisms, optical filters, mobile devices, and display devices. In these application fields, the substitution of such glass materials with resin materials has been actively considered. Among them, curable resin materials that have excellent heat resistance (thermal stability) and strengths receive attention and are increasingly applied to a variety of uses. Under these circumstances, there is a need for curable resin materials excellent in all required properties such as curability, heat resistance (glass transition temperature), and mechanical strength.

Of the curable resin materials, cycloaliphatic epoxides are exemplified as materials having excellent curability, and a variety of ways has been attempted to allow cured products of the cycloaliphatic epoxides to have still better heat resistance (higher glass transition temperature) and/or higher mechanical strength. In a considered way so as to allow a cured product to have higher mechanical strength, a glycidyl-containing compound and/or an oxetanyl-containing compound is incorporated into a cycloaliphatic epoxide. In general, however, the resulting material has inferior curability upon the incorporation of a glycidyl-containing compound. The resulting material gives a cured product having a lower glass transition temperature upon the incorporation of an oxetanyl-containing compound, although the material exhibits better curability. It is difficult to improve the mechanical strength while maintaining the curability and the glass transition temperature at satisfactory levels.

Independently, a variety of attempts have been made to use silicone materials in curable resin materials so as to allow the materials to have better properties. Typically, a known curable composition includes a silicone material, an organic compound, a hydrosilylation catalyst, and fine polymer particles. The silicone material is a compound containing at least two SiH groups per molecule. The organic compound has a triallyl isocyanurate structure and contains carbon-carbon double bonds that are reactive with the SiH groups (see Patent Literature (PTL) 1). A known thermosetting resin composition includes a polysiloxane, an aromatic-ring-containing epoxy resin, and a curing agent. The polysiloxane contains a reactive cyclic ether group and contains D units and T units in a random form. The D units are derived from an aromatic-ring-containing dialkoxysilane. The T units are derived from a trialkoxysilane containing a a reactive cyclic ether group (see PTL 2). Independently, a known optical resin composition includes a silsesquioxane derivative, an alicyclic-skeleton-containing epoxy resin, and a curing agent and gives an optical component having an Abbe number 55 of or more. The silsesquioxane derivative has a random structure and/or a ladder-like structure (either one or both of a random structure and a ladder-like structure) and is obtained by hydrolytically condensing an alkyl- or aryl-containing trialkoxysilane with an epoxy-containing trialkoxysilane (see PTL 3).

All the citations, however, fail to disclose a way to allow a composition to give a cured product having higher mechanical strength while maintaining excellent curability of the composition and a high glass transition temperature of the cured product.

Recent electronic products have had dramatically decreasing size and weight and dramatically increasing performance. Such electronic products are represented by mobile phones, smartphones, tablet terminals, mobile computers, personal digital assistants (PDAs), and digital still cameras (DSCs). With the technological trend, demands have been increasingly made to reduce the size, weight, and thickness of lenses for use typically in cameras to be mounted to these electronic products. To meet the demands, wafer-level lenses have been used increasingly.

Imagers typically of cameras have an increasing number of picture elements. This necessitates lenses having such a high resolving power as to support the increasing number of picture elements and employs, for example, cemented lenses each including a stack of two or more lenses. The wafer-level lenses are suitable for such uses. In general, lenses have different refractive indices for different wavelengths of light and undergo chromatic aberration. The chromatic aberration is a phenomenon in which displacements (halation or blur) occur in the image. To reduce the influence of the chromatic aberration, regular lenses have a structure in which a lens having a high Abbe number is used in combination with a lens having a low Abbe number to compensate the chromatic aberration. Of lens glass for use in cameras, glass having an Abbe number of 50 or less and glass having an Abbe number of 50 or more are respectively called flint glass and crown glass.

As materials for the wafer-level lenses, curable resin materials that have excellent heat resistance and strengths receive attention. To efficiently produce high-quality wafer-level lenses, demands are made to provide curable resin materials that excel in all of curability, heat resistance (e.g., a glass transition temperature), and mechanical strength. Curable resin materials, if being inferior in any of these properties, may adversely affect the quality and/or productivity of the resulting wafer-level lenses. For example, a curable resin material having poor curability requires a long time to undergo a molding process and suffers from inferior productivity. A curable resin material having a low glass transition temperature suffers typically from sagging and causes the resulting lens to have inferior shape precision (dimensional precision). A curable resin material having a low mechanical strength suffers from cracking upon releasing from the mold.

The curable resin materials are exemplified by epoxides that excel typically in electrical properties, water-vapor resistance, and heat resistance. Among them, cycloaliphatic epoxides are materials excellent typically in electrical properties, water-vapor resistance, heat resistance, transparency, and curability and are suitable particularly in molding (forming) of wafer-level lenses. Typically, in a known technique, an organic-inorganic composite resin composition is used so as to give a cured product that has excellent heat resistance and less suffers from heat discoloration due to heating and deterioration in mechanical strength (see PTL 4). The organic-inorganic composite resin composition includes an organic resin component (e.g., a cycloaliphatic epoxide) and an inorganic fine particle component. Although in a known transparent encapsulating material, a cycloaliphatic epoxide is preferably used so as to give a cured product having a higher glass transition temperature (see PTL 5).

Various attempts have been made to allow cured products of curable compositions including a cycloaliphatic epoxide to have still higher glass transition temperatures and/or still higher mechanical strength. Typically, incorporation of a glycidyl-containing compound, an oxetanyl-containing compound, or a silicone compound into a cycloaliphatic epoxide has been attempted. Typically, a known curable composition includes a silicone material, an organic compound, a hydrosilylation catalyst, and fine polymer particles (see PTL 1). The silicone material is a compound containing at least two SiH groups per molecule. The organic compound has a triallyl isocyanurate structure and contains carbon-carbon double bonds that are reactive with the SiH groups. A known thermosetting resin composition includes a polysiloxane, an aromatic ring-containing epoxy resin, and a curing agent (see PTL 2). The polysiloxane contains a reactive cyclic ether group and contains D units and T units in a random form. The D units are derived from a dialkoxysilane containing an aromatic ring. The T units are derived from a trialkoxysilane containing a reactive cyclic ether group. Independently, a known optical resin composition includes a silsesquioxane derivative, an alicyclic skeleton-containing epoxy resin, and a curing agent and gives an optical component having an Abbe number 55 of or more (see PTL 3). The silsesquioxane derivative has a random structure and/or a ladder-like structure (either one or both of a random structure and a ladder-like structure) and is obtained by hydrolytically condensing an alkyl- or aryl-containing trialkoxysilane with an epoxy-containing trialkoxysilane.

Independently, a disclosed method for producing an optical element such as a lens includes producing an optical element wafer and cutting the optical element wafer to give pieces of optical elements (see PTL 6). In the method, the optical element wafer is produced by a method that includes the step of pressing or stamping an optical element material to a predetermined thickness using an upper stamper mold and a lower stamper mold. The optical element material is then cured by light or heat. Another disclosed method for forming an electronic element module includes forming an integrated assembly as a stack of two or more different optical element array plates (see PTL 7). The assembly is then cut at once to give chip sections to thereby give the electronic element module including a stack of two or more lenses. Each of the optical element array sheets includes two or more lenses arrayed in a matrix.

All the citations, however, fail to disclose a way to allow a material to maintain its high curability and to still give a cured product having higher mechanical strength and still having a high glass transition temperature as maintained. In addition, all the citations fail to describe a way to efficiently give a high-quality wafer-level lens as mentioned above.

CITATION LIST

Patent Literature

PTL 1: Japanese Unexamined Patent Application Publication (JP-A) No. 2011-1401
PTL 2: JP-A No. 2011-132416
PTL 3: JP-A No. 2012-116989
PTL 4: JP-A No. 2008-133439
PTL 5: JP-A No. 2008-189698
PTL 6: JP-A No. 2010-102312
PTL 7: JP-A No. 2010-173196

SUMMARY OF INVENTION

Technical Problem

Accordingly, it is an object of the present invention to provide a curable composition that can be cured satisfactorily and can form a cured product having a high glass transition temperature as maintained and having high mechanical strength.

It is another object of the present invention to provide a cured product that has a high glass transition temperature as maintained and still has high mechanical strength.

It is yet another object of the present invention to provide an optical element and an optical device each of which can be obtained with excellent productivity and has heat resistance and mechanical strength both at high levels.

It is still another object of the present invention to provide a curable composition (curable composition for a wafer-level lens) that can be cured satisfactorily and can form a wafer-level lens having excellent optical properties, a high glass transition temperature as maintained, and high mechanical strength.

It is another object of the present invention to provide a wafer-level lens that can be produced with excellent productivity and has excellent optical properties, a high glass transition temperature as maintained, and high mechanical strength.

It is yet another object of the present invention to provide an optical device that can be produced with excellent productivity and includes a wafer-level lens having heat resistance and mechanical strength both at high levels.

Solution to Problem

After intensive investigations to achieve the objects, the present inventors have found that a curable composition including a specific siloxane, a specific epoxide, and a curing agent can be cured satisfactorily; and that the curable composition can form a cured product having a high glass transition temperature as maintained and still having high mechanical strength. The present inventors have also found that a curable composition including a specific epoxide can be cured satisfactorily; that the curable composition can give a wafer-level lens having a high glass transition temperature as maintained and still having high mechanical strength; and that the curable composition, when further containing a specific siloxane, can efficiently give a wafer-level lens with still higher quality. The present invention has been made based on these findings.

Specifically, the present invention provides, in an aspect, a curable composition including a cycloaliphatic epoxide (A), a siloxane (B), and a curing agent (C). The siloxane (B) contains at least two epoxy groups per molecule.

In the curable composition, the cycloaliphatic epoxide (A) may include a compound represented by Formula (I):

[Chem. 1]

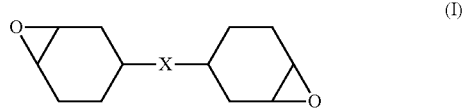
(I)

where X is selected from a single bond and a linkage group.

In the curable composition, the siloxane (B) containing at least two epoxy groups per molecule may contain a cycloaliphatic epoxy group as at least one of the epoxy groups.

The curable composition may contain the cycloaliphatic epoxide (A) in a content of from 5 to 60 percent by weight based on the total amount (100 percent by weight) of the curable composition.

In the curable composition, the cycloaliphatic epoxide (A) may include 3,4,3',4'-diepoxybicyclohexyl.

The curable composition may further include a hydrogenated glycidyl ether epoxide.

The curable composition may serve as a composition for optical element formation.

The present invention provides, in another aspect, a cured product of the curable composition.

The present invention provides, in still another aspect, an optical element including a cured product of the curable composition.

The present invention provides, in yet another aspect, an optical device including the optical element.

In another aspect, the present invention provides a curable composition for a wafer-level lens. The curable composition contains a cycloaliphatic epoxide (A') represented by Formula (I):

[Chem. 2]

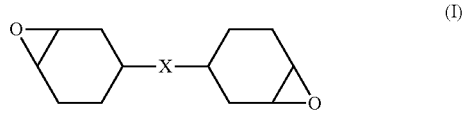
(I)

where X is selected from a single bond and a linkage group.

The curable composition for a wafer-level lens may further contain a siloxane (B) containing at least two epoxy groups per molecule.

In the curable composition for a wafer-level lens, the siloxane (B) containing at least two epoxy groups per molecule may contain a cycloaliphatic epoxy group as at least one of the epoxy groups.

The curable composition for a wafer-level lens may contain the cycloaliphatic epoxide (A') in a content of from 5 to 60 percent by weight based on the total amount (100 percent by weight) of the curable composition.

The curable composition for a wafer-level lens may include 3,4,3',4'-diepoxybicyclohexyl as the cycloaliphatic epoxide (A').

The curable composition for a wafer-level lens may further include a hydrogenated glycidyl ether epoxide.

The present invention provides, in another aspect, a method for producing a wafer-level lens. The method includes subjecting the curable composition for a wafer-level lens to cast molding or injection molding.

In the method for producing a wafer-level lens, the cast molding may include steps 1a, 2a, and 3a as follows. The step 1a is the step of preparing a wafer-level-lens mold including at least one lens pattern. The step 2a is the step of bringing the curable composition for a wafer-level lens into contact with the wafer-level-lens mold. The step 3a is the step of applying heat and/or light to the curable composition for a wafer-level lens to cure the curable composition to thereby give a cured product of the curable composition.

In the method for producing a wafer-level lens, the cast molding may further include the step 4a of annealing the cured product of the curable composition for a wafer-level lens.

In the method for producing a wafer-level lens, the cast molding may further include the step 5a of cutting the cured product of the curable composition for a wafer-level lens.

In the method for producing a wafer-level lens, the injection molding may include steps 1b, 2b, and 3b as follows. The step 1b is the step of preparing a wafer-level-lens mold including at least one lens pattern. The step 2b is the step of injecting the curable composition for a wafer-level lens into the wafer-level-lens mold. The step 3b is the step of applying heat and/or light to the curable composition for a wafer-level lens to cure the curable composition to thereby give a cured product of the curable composition.

In the method for producing a wafer-level lens, the injection molding may further include the step 4b of annealing the cured product of the curable composition for a wafer-level lens.

In yet another aspect, the present invention provides a wafer-level-lens sheet obtained by the method for producing a wafer-level lens.

In still another aspect, the present invention provides a wafer-level lens obtained by the method for producing a wafer-level lens.

The present invention provides, in another aspect, an optical device including the wafer-level lens.

The present invention provides, in still another aspect, a wafer-level lens stack including a stack of wafer-level lenses. The wafer-level lenses constituting the stack include a wafer-level lens obtained by curing and molding the curable composition for a wafer-level lens.

The present invention provides, in yet another aspect, a method for producing a wafer-level lens stack so as to produce the above-mentioned wafer-level lens stack. The method includes steps 1c, 2c, 3c, 4c, and 5c as follows. The step 1c is the step of preparing a wafer-level-lens mold including at least one lens pattern. The step 2c is the step of bringing the curable composition for a wafer-level lens into contact with the wafer-level-lens mold. The step 3c is the step of applying heat and/or light to the curable composition for a wafer-level lens to cure the curable composition to thereby give a wafer-level-lens sheet. The step 4c is the step of stacking a plurality of wafer-level-lens sheets including the prepared wafer-level-lens sheet to give a wafer-level-lens sheet stack. The step 5c is the step of cutting the wafer-level-lens sheet stack.

The method for producing a wafer-level lens stack may further include a step 6c between the step 3c and the step 4c. The step 6c is the step of annealing the wafer-level-lens sheet.

The present invention provides, in another aspect, a wafer-level-lens sheet stack as a stack of a plurality of wafer-level-lens sheets including the wafer-level-lens sheet.

In addition and advantageously, the present invention provides an optical device including the wafer-level lens stack.

Advantageous Effects of Invention

The curable composition according to the present invention, as having the configuration, can be cured satisfactorily and still can give a cured product that has a high glass transition temperature as maintained and exhibits high mechanical strength. The cured product excels in properties such as heat resistance, transparency, and water-vapor resistance. The curable composition is therefore preferably usable as a composition for optical element formation. The term "composition for optical element formation" refers to a material for the formation of a variety of optical elements and optical devices.

The curable composition for a wafer-level lens according to the present invention, as having the configuration, can be cured satisfactorily and still can form a wafer-level lens that has a high glass transition temperature as maintained and exhibits high mechanical strength. In a preferred embodiment, the curable composition for a wafer-level lens according to the present invention further contains a siloxane containing at least two epoxy groups per molecule. This curable composition can efficiently give a wafer-level lens with still higher quality. The curable composition for a wafer-level lens according to the present invention can significantly contribute to a smaller size, a lighter weight, and higher performance of an electronic product including the wafer-level lens.

As used herein the term "wafer-level lens" refers to a lens for use in the wafer-level production of a camera to be used typically in a mobile phone. The "wafer-level lens" may have a size in diameter of typically from about 1 to about 10 mm, and preferably from about 3 to about 5 mm and a thickness of typically from about 100 to about 1500 μm, and preferably from about 500 to about 800 μm.

DESCRIPTION OF EMBODIMENTS

Curable Compositions

The curable composition according to the present invention is a composition including a cycloaliphatic epoxide (A) as an essential component. In particular, preferred embodiments of the curable composition according to the present invention include two embodiments (first and second embodiments) as follows. The curable compositions according to the present invention, in these embodiments, more efficiently exhibit the advantageous effects of the present invention.

The curable composition according to the first embodiment of the present invention is a curable composition that includes a cycloaliphatic epoxide (A), a siloxane (B), and a curing agent (C) as essential components. As used herein the term "siloxane (B)" refers to a siloxane that contains at least two epoxy groups per molecule (in one molecule). The curable composition according to the first embodiment is also referred to as a "curable composition [1]according to the present invention".

The curable composition according to the second embodiment of the present invention is a curable composition for a wafer-level lens. This curable composition includes a cycloaliphatic epoxide (A') represented by Formula (I) below as an essential component. The curable composition according to the second embodiment is also referred to as a "curable composition [2] according to the present invention".

Curable Composition [1] According to Present Invention

The curable composition [1] according to the present invention is a composition including the cycloaliphatic epoxide (A), the siloxane (B), and the curing agent (C) as essential components, as described above. The curable composition [1] according to the present invention may further include one or more other components in addition to the above components.

Cycloaliphatic Epoxide (A)

The cycloaliphatic epoxide (A) acts as an essential component of the curable composition [1] according to the present invention and is a compound containing at least a cycloaliphatic (alicyclic) structure and an epoxy group in molecule. Specifically, the cycloaliphatic epoxide (A) is exemplified by compounds (i) and compounds (ii). The compounds (i) each contain an epoxy group (cycloaliphatic epoxy group) including an oxygen atom and two adjacent carbon atoms constituting an alicycle. The compounds (ii) each contain an epoxy group directly bonded to an alicycle through a single bond. The cycloaliphatic epoxides (A) do not include the siloxanes (B) and the after-mentioned hydrogenated glycidyl ether epoxides.

The compounds (i) for use herein may optionally be selected from among known or common ones, where the compounds (i) contain an epoxy group (cycloaliphatic epoxy group) including an oxygen atom and two adjacent carbon atoms constituting an alicycle. In particular, the cycloaliphatic epoxy group is preferably a cyclohexene oxide group.

Of the compounds (i) containing an epoxy group (cycloaliphatic epoxy group) including an oxygen atom and two adjacent carbon atoms constituting an alicycle, preferred are cyclohexene oxide-containing compounds, of which particularly preferred is a compound represented by Formula (I) (cycloaliphatic epoxide). These are preferred from the viewpoints of transparency and heat resistance of the cured product. The compound represented by Formula (I) is also referred to as a "cycloaliphatic epoxide (A')". Formula (I) is expressed as follows:

[Chem. 3]

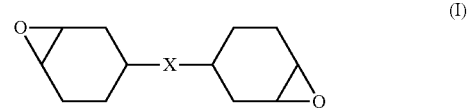

In Formula (I), X is selected from a single bond and a linkage group. The linkage group refers to a divalent group containing at least one atom and is exemplified by divalent hydrocarbon groups, carbonyl, ether bond, ester bond, carbonate, amido, and groups each including two or more of them linked to each other.

The cycloaliphatic epoxide (A) of Formula (I) in which X is a single bond includes 3,4,3',4'-diepoxybicyclohexyl.

The divalent hydrocarbon groups are exemplified by linear or branched-chain $C_1$-$C_{18}$ alkylene, and divalent alicyclic hydrocarbon groups. The linear or branched-chain $C_1$-$C_{18}$ alkylene is exemplified by methylene, methylmethylene, dimethylmethylene, ethylene, propylene, and trimethylene. The divalent alicyclic hydrocarbon groups are exemplified by divalent cycloalkylene (including cycloalkylidene), such as 1,2-cyclopentylene, 1,3-cyclopentylene, cyclopentylidene, 1,2-cyclohexylene, 1,3-cyclohexylene, 1,4-cyclohexylene, and cyclohexylidene.

The linkage group X is preferably any of oxygen-containing linkage groups such as —CO—, —O—CO—O—, —COO—, —O—, and —CONH—; groups each including two or more of them linked to each other; and groups each including one or more of these groups and one or more divalent hydrocarbon groups linked to each other. The divalent hydrocarbon groups are as exemplified above.

The cycloaliphatic epoxide represented by Formula (I) is typified by compounds represented by Formulae (I-1) to (I-10) below. In Formulae (I-5) and (I-7), 1 and m each represent an integer of from 1 to 30. In Formula (I-5), R represents $C_1$-$C_8$ alkylene and is exemplified by linear or branched-chain alkylene such as methylene, ethylene, propylene, isopropylene, butylene, isobutylene, s-butylene, pentylene, hexylene, heptylene, and octylene. Among them, preferred is $C_1$-$C_3$ linear or branched-chain alkylene such as methylene, ethylene, propylene, and isopropylene. In Formulae (I-9) and (I-10), n1 to n6 each represent an integer of from 1 to 30.

[Chem. 4]

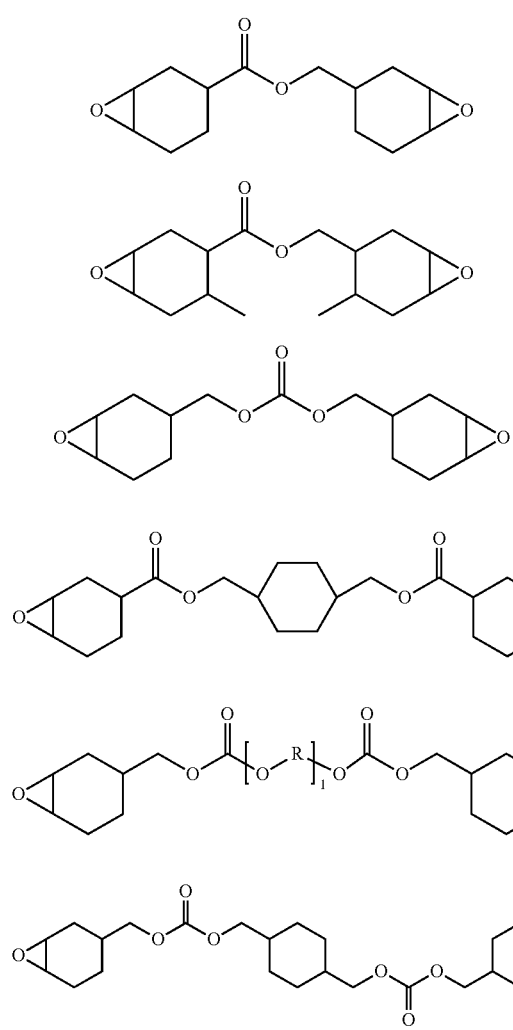

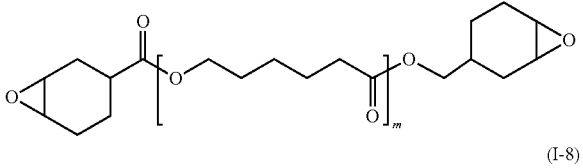

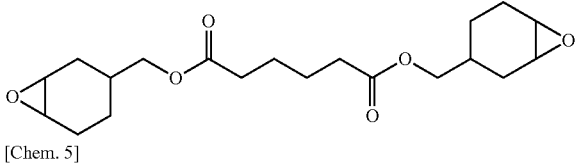

[Chem. 5]

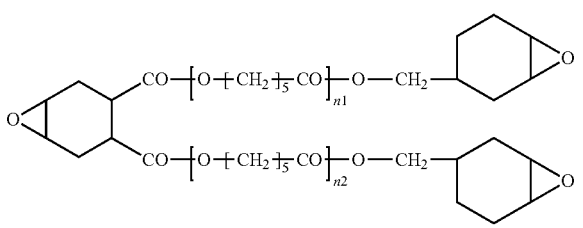

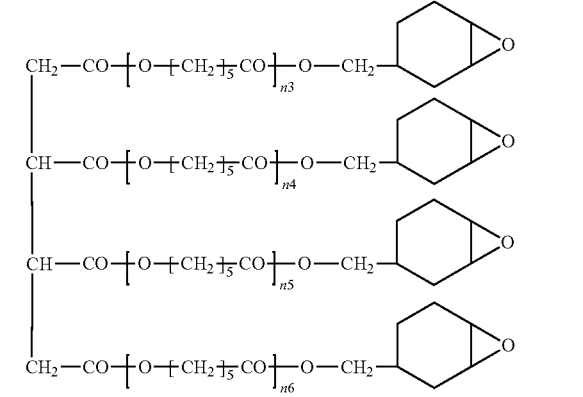

The compounds (ii) containing an epoxy group directly bonded to an alicycle through a single bond are exemplified by compounds represented by Formula (II):

[Chem. 6]

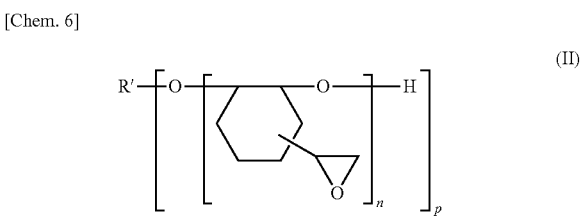

In Formula (II), R' represents a group corresponding to a p-hydric alcohol, except for removing —OH in the number of p from the structural formula of the alcohol. The numbers p and n represent, independently in each occurrence, a natural number. The p-hydric alcohol [R'—(OH)$_p$] is exemplified by polyhydric alcohols (e.g., $C_1$-$C_{15}$ alcohols) such as 2,2-bis(hydroxymethyl)-1-butanol. The number p is preferably from 1 to 6, and the number n is preferably from 1 to 30. When p is 2 or more, two or more occurrences of n in the group in the brackets (outer brackets) may be identical or different. Specifically, the compounds are exemplified by an 1,2-epoxy-4-(2-oxiranyl)cyclohexane adduct of 2,2-bis (hydroxymethyl)-1-butanol, or a product available under the trade name of EHPE3150 (from Daicel Corporation).

The curable composition [1] according to the present invention may include, as the cycloaliphatic epoxide (A), each of different epoxides alone or in combination. The cycloaliphatic epoxide (A) may be produced by a known or common method. The cycloaliphatic epoxide (A) for use herein may also be available as commercial products typically under the trade names of CELLOXIDE 2021P and CELLOXIDE 2081 (each from Daicel Corporation).

As the cycloaliphatic epoxide (A), preferred are the compound represented by Formula (I-1) [3,4-epoxycyclohexylmethyl (3,4-epoxy)cyclohexanecarboxylate or the product available under trade name of CELLOXIDE 2021P (from Daicel Corporation)]; and 3,4,3',4'-diepoxybicyclohexyl. In particular, the curable composition preferably includes 3,4,3',4'-diepoxybicyclohexyl as an essential component. This is preferred from the viewpoints of the curability of the curable composition, and the water-vapor resistance, heat resistance (glass transition temperature), low shrinkage, and low linear expansion of the cured product.

The curable composition [1] according to the present invention may contain the cycloaliphatic epoxide (A) in a content (blending quantity) not critical, but preferably from 5 to 60 percent by weight, more preferably from 10 to 55 percent by weight, and furthermore preferably from 15 to 50 percent by weight, based on the total amount (100 percent by weight) of the curable composition. The curable composition, if containing the cycloaliphatic epoxide (A) in a content out of the range, may cause the cured product to hardly have heat resistance and mechanical strength in a good balance at high levels.

In an embodiment, the curable composition [1] according to the present invention includes 3,4,3',4'-diepoxybicyclohexyl as the cycloaliphatic epoxide (A). In this embodiment, the curable composition may contain the 3,4,3',4'-diepoxybicyclohexyl in an amount (blending quantity) not critical, but preferably from 10 to 50 percent by weight, more preferably from 15 to 45 percent by weight, and furthermore preferably from 20 to 40 percent by weight, based on the total amount (100 percent by weight) of curable compounds contained in the curable composition. The curable composition, if containing 3,4,3',4'-diepoxybicyclohexyl in an amount of less than 10 percent by weight, may exhibit insufficient curability and/or may cause the cured product to be insufficient in water-vapor resistance, heat resistance (glass transition temperature), low shrinkage, and/or low linear expansion in some use situations. In contrast, the curable composition, if containing 3,4,3',4'-diepoxybicyclohexyl in an amount of greater than 50 percent by weight, may cause the cured product to have insufficient mechanical strength.

Siloxane (B)

The siloxane (B) acts as an essential component of the curable composition [1] according to the present invention and is a compound that contains at least two epoxy groups per molecule and includes a siloxane skeleton including a siloxane bond (Si—O—Si). The siloxane skeleton in the siloxane (B) is exemplified by, but not limited to, cyclic siloxane skeletons; and polysiloxane skeletons typically of linear or branched-chain silicones (straight chain or branched chain polysiloxanes) and of cage-like or ladder-like polysilsesquioxanes. Of the siloxane skeletons, preferred are cyclic siloxane skeletons. These are preferred from the viewpoints of the curability of the curable composition, and the heat resistance and mechanical strength of the cured product. Specifically, cyclic siloxanes containing at least two epoxy groups per molecule are preferred as the siloxane (B).

In an embodiment, the siloxane (B) includes a cyclic siloxane containing at least two epoxy groups. In this embodiment, the siloxane ring may include Si—O units in a number not critical, but preferably from 2 to 12, and more preferably from 4 to 8. This is preferred from the viewpoints of the curability of the curable composition, and the heat resistance and mechanical strength of the cured product. The number of the Si—O units is equal to the number of silicon atoms constituting the siloxane ring.

The siloxane (B) may include epoxy groups in a number not critical, as long as being 2 or more, but preferably from 2 to 4, and more preferably 3 or 4. This is preferred from the viewpoints of the curability of the curable composition, and the heat resistance and mechanical strength of the cured product.

The siloxane (B) may have an epoxy equivalent not critical, but preferably from 180 to 400, more preferably from 240 to 400, and furthermore preferably from 240 to 350. This is preferred from the viewpoints of the curability of the curable composition, and the heat resistance and mechanical strength of the cured product. The epoxy equivalent is determined in conformity with JIS K7236.

Though not limited, at least one (preferably at least two, and more preferably all) of the epoxy groups in the siloxane (B) is preferably a cycloaliphatic epoxy group. The "cycloaliphatic epoxy group" refers to an epoxy group including an oxygen atom and two adjacent carbon atoms constituting an alicycle. In particular, at least one (preferably at least two, and more preferably all) of the epoxy groups is preferably a cyclohexene oxide group. The "cyclohexene oxide group" refers to an epoxy group including an oxygen atom and two adjacent carbon atoms constituting a cyclohexane ring. These are preferred from the viewpoint of the curability of the curable composition.

The siloxane (B) is exemplified by a compound (cyclic siloxane) represented by Formula (1):

[Chem. 7]

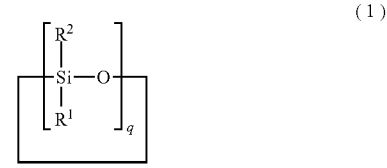

(1)

In Formula (1), $R^1$ and $R^2$ are, independently in each occurrence, selected from alkyl and a monovalent group containing a cycloaliphatic epoxy group, where at least two occurrences of $R^1$ and $R^2$ in the compound represented by Formula (1) are each independently a monovalent group containing a cycloaliphatic epoxy group. In Formula (1), q represents an integer of 3 or more and is preferably an integer of from 3 to 6. $R^1$ and $R^2$ in each occurrence in the compound represented by Formula (1) may be identical or different. The plural occurrences of $R^1$ may be identical or different. Likewise, the plural occurrences of $R^2$ may be identical or different.

The monovalent group containing a cycloaliphatic epoxy group is exemplified by, but not limited to, a group represented by -A-$R^3$, where A represents alkylene, and R³ represents a cycloaliphatic epoxy group. The alkylene A is exemplified by $C_1$-$C_{18}$ linear or branched-chain alkylene such as methylene, methylmethylene, dimethylmethylene, ethylene, propylene, and trimethylene. The group R³ is exemplified by cyclohexene oxide group.

More specifically, the siloxane (B) is exemplified by 2,4-di[2-(3-{oxabicyclo[4.1.0]heptyl})ethyl]-2,4,6,6,8,8-hexamethyl-cyclotetrasiloxane, 4,8-di[2-(3-{oxabicyclo[4.1.0]heptyl})ethyl]-2,2,4,6,6,8-hexamethyl-cyclotetrasiloxane, 2,4-di[2-(3-{oxabicyclo[4.1.0]heptyl})ethyl]-6,8-dipropyl-2,4,6,8-tetramethyl-cyclotetrasiloxane, 4,8-di[2-(3-{oxabicyclo[4.1.0]heptyl})ethyl]-2,6-dipropyl-2,4,6,8-tetramethyl-cyclotetrasiloxane, 2,4,8-tri[2-(3-{oxabicyclo[4.1.0]heptyl})ethyl]-2,4,6,8-pentamethyl-cyclotetrasiloxane, 2,4,8-tri[2-(3-{oxabicyclo[4.1.0]heptyl})ethyl]-6-propyl-2,4,6,8-tetramethyl-cyclotetrasiloxane, 2,4,6,8-tetra[2-(3-{oxabicyclo[4.1.0]heptyl})ethyl]-2,4,6,8-tetramethyl-cyclotetrasiloxane, and epoxy-containing silsesquioxanes. Furthermore specifically, the siloxane (B) is exemplified by cyclic siloxanes containing at least two epoxy groups per molecule and being represented by the formulae:

[Chem. 8]

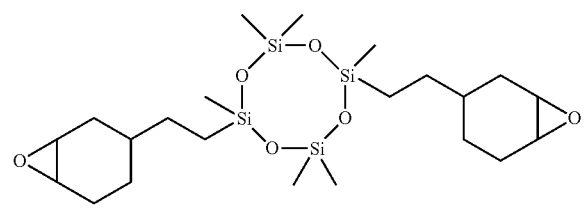

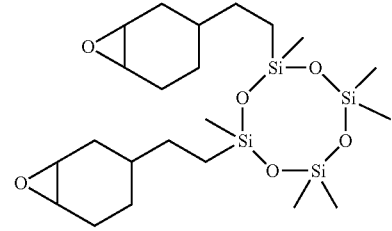

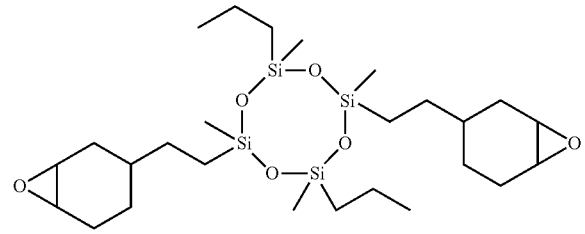

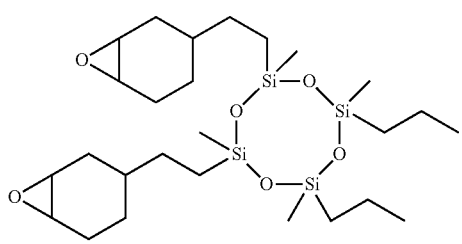

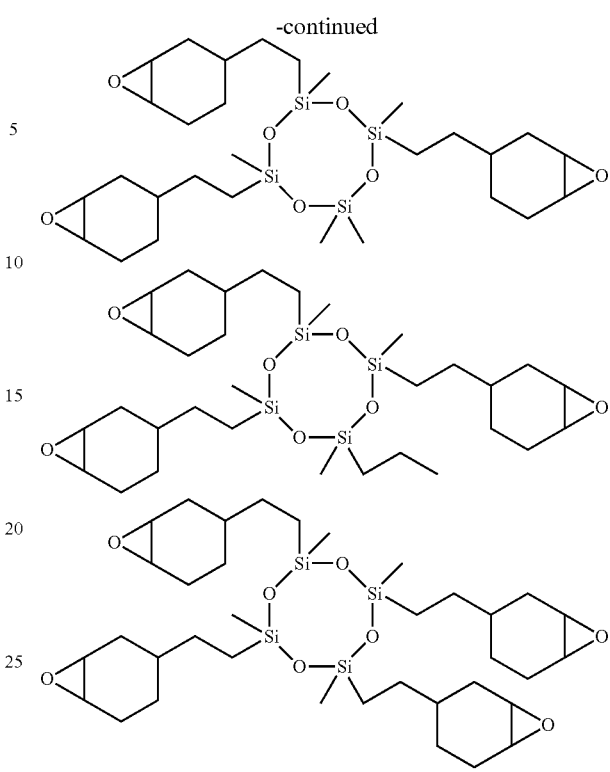

Examples of the siloxane (B) for use herein also include silicone resins containing cycloaliphatic epoxy groups, described in JP-A No. 2008-248169; and organopolysilsesquioxane resins containing at least two epoxy functional groups per molecule, described in JP-A No. 2008-19422.

The curable composition [1] according to the present invention may include, as the siloxane (B), each of different siloxanes alone or in combination. The siloxane (B) for use herein is also available as commercial products typically under the trade names of X-40-2678, X-40-2670, and X-40-2720 (each from Shin-Etsu Chemical Co., Ltd.).

The curable composition [1] according to the present invention may contain the siloxane (B) in a content (blending quantity) not critical, but preferably from 1 to 50 percent by weight, more preferably from 5 to 45 percent by weight, and furthermore preferably from 10 to 40 percent by weight, based on the total amount (100 percent by weight) of the curable composition [1] according to the present invention. The curable composition, if containing the siloxane (B) in a content out of the range, may hardly allow the cured product to have heat resistance and mechanical strength in a good balance at high levels.

The curable composition [1] according to the present invention may contain the siloxane (B) in an amount (blending quantity) not critical, but preferably from 1 to 60 percent by weight, more preferably from 5 to 55 percent by weight, and furthermore preferably from 10 to 50 percent by weight, based on the total amount (100 percent by weight) of curable compounds contained in the curable composition. The total amount herein is the total amount of curable compounds such as epoxides and oxetane compounds. The curable composition, if containing the siloxane (B) in an amount out of the range, may hardly allow the cured product to have heat resistance and mechanical strength in a good balance at high levels.

Curing Agent (C)

The curing agent (C) acts as an essential component of the curable composition [1] according to the present invention. The curing agent (C) is a compound that functionally initiates or promotes the curing reaction of a curable compound (in particular, an epoxide) or reacts with the curable compound to cure the curable composition. The curable compound contains a curable group (in particular, an epoxy group) and is exemplified by the cycloaliphatic epoxide (A) and the siloxane (B). The curing agent (C) is exemplified by known or common curing agents such as curing catalysts. The curable composition [1] according to the present invention may include each of different curing agents alone or in combination as the curing agent (C).

In an embodiment, a curing catalyst is used as the curing agent (C). The curing catalyst for use herein is exemplified by, but not limited to, cationic catalysts (cationic-polymerization initiators). The cationic catalysts generate a cationic species upon the application of light (in particular, an ultraviolet ray) or heat to initiate polymerization. Specifically, the curing catalyst is exemplified by photo-cationic polymerization initiators (photoacid generators) and thermal-cationic polymerization initiators (thermal acid generators). In an embodiment, the curing agent (C) is a curing catalyst acting as a photo-cationic polymerization initiator or thermal cationic polymerization initiator. In this embodiment, the resulting curable composition may readily exhibit excellent curability to efficiently give a cured product with smaller tack. In contrast, typically assume that the curable composition employs, as the curing agent (C), an acid anhydride well known as a curing agent for epoxy resins. In this case, the curable composition may readily have remarkably inferior curability, and this may impede the production of a cured product with high productivity.

The cationic catalysts that generate a cationic species upon the application of light (in particular, an ultraviolet ray) are also referred to as photo-cationic polymerization initiators and are exemplified by hexafluoroantimonate salts, pentafluorohydroxy antimonate salts, hexafluorophosphate salts, and hexafluoroarsenate salts. The cationic catalysts (photo-cationic polymerization initiators) may also be preferably selected from commercial products available typically under the trade names of: UVACURE 1590 (from DAICEL-CYTEC Company, Ltd.); CD-1010, CD-1011, and CD-1012 (each from Sartomer Company Inc., U.S.A.); IRGACURE 264 (from BASF SE); CIT-1682 (from Nippon Soda Co., Ltd.); and CPI-101A (from San-Apro Ltd.).

The cationic catalysts that generate a cationic species upon the application of heat (heat treatment) are also referred to as thermal cationic polymerization initiators and are exemplified by aryldiazonium salts, aryliodonium salts, arylsulfonium salts, and arene-ion complexes. The thermal cationic polymerization initiators for use herein are also preferably selected from commercial products available typically under the trade names of: PP-33, CP-66, and CP-77 (each from ADEKA CORPORATION); FC-509 (from 3M Company); UVE1014 (from G.E.); San-Aid SI-60L, San-Aid SI-80L, San-Aid SI-100L, San-Aid SI-110L, and San-Aid SI-150L (each from SANSHIN CHEMICAL INDUSTRY CO., LTD.); and CG-24-61 (from Ciba Japan K.K.). The thermal cationic polymerization initiators may also be selected from compounds between a chelate compound and a silanol; and compounds between the chelate compound and a phenol. The chelate compound is exemplified by a chelate compound of a metal (e.g., aluminum or titanium) with acetoacetic acid or a diketone. The silanol is exemplified by triphenylsilanol. The phenol is exemplified by bisphenol-S.

In an embodiment, the curing catalyst is used as the curing agent (C). In this embodiment, the curable composition [1] according to the present invention may contain the curing catalyst in an amount (blending quantity) not critical, but preferably from 0.01 to 15 parts by weight, more preferably from 0.01 to 10 parts by weight, furthermore preferably from 0.05 to 10 parts by weight, and particularly preferably from 0.1 to 5 parts by weight, per 100 parts by weight of the total amount of curable compounds contained in the curable composition. The curable composition in this embodiment, when containing the curing catalyst in an amount within the range, can allow the cured product to excel in heat resistance, light resistance (lightfastness), and transparency.

Other Cationically Curable Compounds

The curable composition [1] according to the present invention may further include one or more other cationically curable compounds. The other cationically curable compounds are those other than the siloxane (B) and the cycloaliphatic epoxide (A) and hereinafter also simply referred to as "other cationically curable compounds". The other cationically curable compounds are exemplified by epoxides other than the siloxane (B) and the cycloaliphatic epoxide (A); oxetane compounds; and vinyl ether compounds. Such other epoxides than the siloxane (B) and the cycloaliphatic epoxide (A) are also referred to as "other epoxides". In an embodiment, the curable composition contains one or more other cationically curable compounds. The curable composition in this embodiment may have a controlled viscosity to be handled more satisfactorily, and/or may become resistant to cure shrinkage upon the formation of a cured product. The curable composition [1] according to the present invention may include each of different other cationically curable compounds alone or in combination.

The other epoxides are exemplified by aromatic glycidyl ether epoxides such as bisphenol-A epoxides, bisphenol-F epoxides, biphenol epoxides, phenol novolac epoxides, cresol novolac epoxides, bisphenol-A cresol novolac epoxides, naphthalene epoxides, and epoxides derived from trisphenolmethane; aliphatic glycidyl ether epoxides such as aliphatic polyglycidyl ethers; glycidyl ester epoxides; glycidylamine epoxides; and hydrogenated glycidyl ether epoxides (nuclear-hydrogenated aromatic glycidyl ether epoxides). Among them, hydrogenated glycidyl ether epoxides are preferred from the viewpoints of the transparency and water-vapor resistance of the cured product. Specifically, the hydrogenated glycidyl ether epoxides are exemplified by hydrogenated bisphenol-A epoxides such as 2,2-bis[4-(2,3-epoxypropoxy)cyclohexyl]propane, 2,2-bis[3,5-dimethyl-4-(2,3-epoxypropoxy)cyclohexyl]propane, and multimers of them, where these compounds obtained by hydrogenation of bisphenol-A epoxides; hydrogenated bisphenol-F epoxides such as bis[o,o-(2,3-epoxypropoxy)cyclohexyl]methane, bis[o,p-(2,3-epoxypropoxy)cyclohexyl]methane, bis[p,p-(2,3-epoxypropoxy)cyclohexyl]methane, bis[3,5-dimethyl-4-(2,3-epoxypropoxy)cyclohexyl]methane, and multimers of them, where these compounds are obtained by hydrogenation of bisphenol-F epoxides; hydrogenated biphenol epoxides; hydrogenated phenol novolac epoxides; hydrogenated cresol novolac epoxides; hydrogenated bisphenol-A cresol novolac epoxides; hydrogenated naphthalene epoxides; and hydrogenated derivatives of epoxides derived from trisphenolmethane.

The oxetane compounds are exemplified by trimethylene oxide, 3,3-bis(vinyloxymethyl)oxetane, 3-ethyl-3-hydroxymethyloxetane, 3-ethyl-3-(2-ethylhexyloxymethyl) oxetane, 3-ethyl-3-(hydroxymethyl)oxetane, 3-ethyl-3-[(phenoxy)methyl]oxetane, 3-ethyl-3-(hexyloxymethyl) oxetane, 3-ethyl-3-(chloromethyl)oxetane, 3,3-bis (chloromethyl)oxetane, 1,4-bis[(3-ethyl-3-oxetanylmethoxy)methyl]benzene, bis{[1-ethyl (3-oxetanyl)]methyl} ether, 4,4'-bis[(3-ethyl-3-oxetanyl) methoxymethyl]bicyclohexyl, 1,4-bis[(3-ethyl-3-oxetanyl) methoxymethyl]cyclohexane, and 3-ethyl-3{[(3-ethyl-oxetan-3-yl)methoxy]methyl}oxetane.

Among them, hydrogenated glycidyl ether epoxides and oxetane compounds are preferred, of which hydrogenated glycidyl ether epoxides are more preferred. These are preferred from the viewpoints of the transparency, water-vapor resistance, and mechanical strength of the cured product.

The other cationically curable compounds for use herein may also be selected from commercial products available typically under the trade names of: YX8000 (from Mitsubishi Chemical Corporation); and ARON OXETANE OXT221 (from Toagosei Co., Ltd.).

The curable composition [1] according to the present invention may contain the other cationically curable compound(s) in a content (blending quantity) not critical, but preferably from 0 to 50 percent by weight (e.g., 5 to 50 percent by weight), more preferably from 0 to 30 percent by weight (e.g., 5 to 30 percent by weight), and furthermore preferably from 0 to 15 percent by weight, based on the total amount (100 percent by weight) of the curable composition.

In an embodiment, the curable composition [1] according to the present invention includes one or more hydrogenated glycidyl ether epoxides. In this embodiment, the curable composition may include the hydrogenated glycidyl ether epoxide(s) in an amount (blending quantity) not critical, but preferably from 5 to 40 percent by weight, and more preferably from 10 to 30 percent by weight, based on the total amount (100 percent by weight) of curable compounds contained in the curable composition. The curable composition, when containing the hydrogenated glycidyl ether epoxide(s) in an amount of 5 percent by weight or more, may allow the cured product to have still higher mechanical strength. In contrast, the curable composition, if containing the hydrogenated glycidyl ether epoxide(s) in an amount of greater than 40 percent by weight, may have poor curability in some use situations.

In an embodiment, the curable composition [1] according to the present invention contains one or more oxetane compounds. In this embodiment, the curable composition may contain the oxetane compound(s) in an amount (blending quantity) not critical, but preferably from 5 to 30 percent by weight, and more preferably from 5 to 20 percent by weight, based on the total amount (100 percent by weight) of curable compounds contained in the curable composition. The curable composition, when containing the oxetane compound(s) in an amount of 5 percent by weight or more, may exhibit still better curability (in particular, curability upon curing by ultraviolet irradiation). In contrast, the curable composition, if containing the oxetane compound(s) in an amount of greater than 30 percent by weight, may cause the cured product to have poor heat resistance in some use situations.

Additives and Other Components

The curable composition [1] according to the present invention may further include one or more other components such as additives. The additives include known or common additives and are exemplified by, but not limited to, metal oxide particles, rubber particles, silicone- or fluorine-antifoaming agents, silane coupling agents, fillers, plasticizers, leveling agents, antistatic agents, mold-release agents (releasing agents), flame retardants, colorants, antioxidants, ultraviolet absorbers, ion adsorbents, and pigments. The curable composition [1] according to the present invention may contain such additive or additives each in a content (blending quantity) not critical, but preferably 5 percent by weight or less based on the total amount (100 percent by weight) of the curable composition. The curable composition [1] according to the present invention may include a solvent. However, the solvent, if present in an excessively high content, may cause the cured product to include bubbles. To prevent this, the content of the solvent is preferably controlled to 10 percent by weight or less, and more preferably 1 percent by weight or less, based on the total amount (100 percent by weight) of the curable composition [1] according to the present invention.

The curable composition [1] according to the present invention preferably excludes a composition containing a monoallyl diglycidyl isocyanurate compound represented by Formula (2) below. The curable composition [1] according to the present invention, if including the monoallyl diglycidyl isocyanurate compound represented by Formula (2), may tend to be cured unsatisfactorily, and this may often impede the preparation of a cured product without tack. In addition, this curable composition may readily cause disadvantages such as warping of the resulting cured product. In Formula (2), $R^4$ and $R^5$ are, independently in each occurrence, selected from hydrogen and $C_1$-$C_8$ alkyl. The $C_1$-$C_8$ alkyl is exemplified by linear or branched-chain alkyl such as methyl, ethyl, propyl, isopropyl, butyl, isobutyl, s-butyl, pentyl, hexyl, heptyl, and octyl.

[Chem. 9]

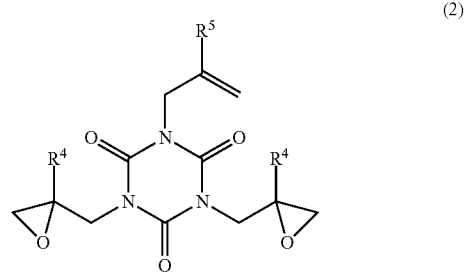

(2)

The curable composition [1] according to the present invention may be prepared by a process that is exemplified by, but not limited to, a process of formulating predetermined amounts of the cycloaliphatic epoxide (A), the siloxane (B), the curing agent (C), and other optional component(s) as needed, and stirring and mixing them. Where necessary, the stirring-mixing may be performed while removing bubbles typically in vacuo. The stirring-mixing is performed at a temperature of typically preferably from about 10° C. to about 60° C. The stirring-mixing may employ a known or common apparatus such as planetary centrifugal mixers, single- or multi-screw extruders, planetary mixers, kneaders, and dissolvers.

The curable composition [1] according to the present invention, when cured, gives a cured product. This cured product is also referred to as a "cured product [1] according to the present invention". The curing (curing reaction) of the curable composition [1] according to the present invention may be allowed to proceed by the application of heat (heat treatment) and/or light (light irradiation). The heat treatment, when employed, may be performed at a temperature not critical, but preferably from 100° C. to 200° C., and more preferably from 120° C. to 160° C. The temperature, however, may be adjusted as appropriate depending typically on the types of the components and catalyst to undergo the reaction. The light irradiation, when employed, may be performed using a light source. The light source is exemplified by mercury lamps, xenon lamps, carbon arc lamps, metal halide lamps, sunlight, electron beam sources, and laser sources. After the light irradiation, heat treatment at a temperature typically from about 50° C. to about 180° C. may be performed so as to allow the curing reaction to further proceed.

The cured product [1] according to the present invention may have an internal transmittance at 400 nm [for a thickness of 0.5 mm] not critical, but preferably 70% or more (e.g., from 70% to 100%), more preferably 75% or more, furthermore preferably 80% or more, and particularly preferably 85% or more. The cured product [1] according to the present invention may have a refractive index not critical, but preferably from 1.40 to 1.60, and more preferably from 1.45 to 1.55. The cured product [1] according to the present invention may have an Abbe number not critical, but preferably 45 or more, and more preferably 50 or more.

The cured product [1] according to the present invention may have a glass transition temperature (Tg) not critical, but preferably 100° C. or higher (e.g., from 100° C. to 200° C.), and more preferably 140° C. or higher. The cured product, if having a glass transition temperature of lower than 100° C., may have insufficient heat resistance in some use situations. The glass transition temperature of the cured product may be measured typically by any of measurement techniques such as a variety of thermal analyses [e.g., DSC (differential scanning calorimeter) and TMA (thermomechanical analyzer)]; and dynamic viscoelastic measurement. More specifically, the glass transition temperature may be measured by a measurement method described in working examples below.

The cured product [1] according to the present invention may have a linear expansion coefficient α1 not critical, but preferably from 40 to 100 ppm/° C., and more preferably from 40 to 90 ppm/° C. The linear expansion coefficient α1 is one at temperatures equal to or lower than the glass transition temperature. The cured product [1] according to the present invention may have a linear expansion coefficient α2 not critical, but preferably from 90 to 150 ppm/° C., and more preferably from 90 to 130 ppm/° C. The linear expansion coefficient α2 is one at temperatures equal to or higher than the glass transition temperature. The linear expansion coefficients α1 and α2 may be measured typically by TMA and, more specifically, may be measured by a measurement method described in the working examples.

The cured product [1] according to the present invention may have a storage elastic modulus at 25° C. not critical, but preferably 0.1 GPa or more, and more preferably 1 GPa or more. The storage elastic modulus of the cured product at 25° C. may be measured typically by the dynamic viscoelastic measurement, and, more specifically, may be measured by a measurement method described in the working examples.

The cured product [1] according to the present invention may have a bending strength (flexural strength) at 25° C. not critical, but preferably from 80 to 200 MPa, and more preferably from 100 to 200 MPa. The cured product [1] according to the present invention may have a bending strain at 25° C. not critical, but preferably 2% or more, and more preferably 3% or more. The "bending strain" refers to a strain at the maximum bending stress. The bending strength and bending strain of the cured product at 25° C. may be measured typically in conformity to JIS K7171 and, more specifically, may be measured by a measurement method described in the working examples.

The curable composition [1] according to the present invention can be cured satisfactorily and still can form a cured product that has a high glass transition temperature as maintained and has high mechanical strength. The curable composition [1] is therefore preferably usable particularly as a material for the formation of an optical element (as a composition for optical element formation). Specifically, the optical element is an optical element including the cured product [1] obtained by curing the curable composition [1] (composition for optical element formation) according to the present invention. The optical element is exemplified by elements (members) that develop any of a variety of optical functions such as light diffusivity, optical transparency, and light reflectivity; and components or members constituting optical devices. The term "optical device" as used herein generically refers to devices and equipment utilizing any of the optical functions. Specifically, the optical element is exemplified by elements in liquid crystal display devices, such as color filters, color filter-protecting films, TFT planarizing films, substrate materials, light guide panels, prism sheets, polarizing plates (polarizing films), retarders (retardation films), viewing-angle compensation films, polarizer-protecting films, a variety of coating materials (coating agents), adhesives (bonding agents), and end-sealing materials (end-sealing agents); elements in optical semiconductor display devices, such as molding compounds (molding agents) and encapsulants (encapsulating agents) for optical semiconductor elements, shield-glass protecting films, shield-glass substitute materials, a variety of coating materials (coating agents), and adhesives (bonding agents); elements in plasma display panels, such as antireflection films, optical compensation films, housing materials, shield-glass protecting films, shield-glass substitute materials, a variety of coating materials (coating agents), and adhesives (bonding agents); elements in plasma address liquid crystal displays, such as substrate materials, light guide panels, prism sheets, polarizing plates, retardation films, viewing-angle compensation films, polarizer-protecting films, a variety of coating materials (coating agents), and adhesives (bonding agents); elements in organic electroluminescence displays, such as shield-glass protecting films, shield-glass substitute materials, a variety of coating materials (coating agents), and adhesives (bonding agents); and elements in field emission displays, such as a variety of film substrates, shield-glass protecting films, shield-glass substitute materials, a variety of coating materials (coating agents), and adhesives (bonding agents).

In addition, the optical element is further exemplified by optical elements used in the fields of optical recording, optical instruments, optical components, optical fibers, and optoelectronic functional organic materials. The optical elements for use in optical recording are exemplified by disc substrate materials for CD/CD-ROM, CD-R/RW, DVD-R/DVD-RAM, MO/MD, phase change discs (PDs), Blu-Ray, and optical memory cards; pick-up lenses; photo-detector units; protecting films; a variety of coating materials (coating agents), and adhesives (bonding agents). The optical elements for use in optical instruments are exemplified by elements for use in still cameras, such as lens materials, viewfinder prisms, target prisms, viewfinder covers, photo-detector units, a variety of coating materials (coating agents), and adhesives (bonding agents); elements for use in video cameras, such as image-pickup lenses, viewfinders, a variety of coating materials (coating agents), and adhesives (bonding agents); elements for use in projection television sets, such as projector lenses, protecting films, a variety of coating materials (coating agents), and adhesives (bonding agents); elements for use in optical sensing devices, such as lens materials, a variety of films, a variety of coating materials (coating agents), and adhesives (bonding agents); and elements for use in cameras mounted to portable terminals (e.g., smartphones), such as lenses, a variety of coating materials (coating agents), and adhesives (bonding agents). The optical elements for use in optical components are exemplified by peripheral elements for optical switches in optical communication systems, such as fiber materials, lenses, waveguides, elements (devices), a variety of coating materials (coating agents), and adhesives (bonding agents); peripheral elements for optical connectors, such as optical fiber materials, ferrules, a variety of coating materials (coating agents), and adhesives (bonding agents); elements for use in optical passive components or optical circuit components, such as lenses, waveguides, a variety of coating materials (coating agents), and adhesives (bonding agents); and peripheral elements for optoelectronic integrated circuits (OEICs), such as substrate materials, fiber materials, a variety of coating materials (coating agents), and adhesives (bonding agents). The optical elements for use in or for optical fibers are exemplified by optical fibers, a variety of coating materials (coating agents), and adhesives (bonding agents) each for use in decorative display illumination and light guides (light pipes), industrial-use sensors, indications and signs, and elements for the coupling or connection of digital devices for communication infrastructures or for domestic use. The optical elements for use in or for optoelectronic functional organic materials are exemplified by peripheral materials for organic EL devices, peripheral substrate materials for organic photorefractive elements, light amplifying elements (light amplifiers) acting as light-light converting devices, optical computing elements, organic solar cells, and fiber materials, encapsulants (encapsulating agents) for such elements or devices, a variety of coating materials (coating agents), and adhesives (bonding agents).

The optical element is still further exemplified by optical elements for use in the fields of automobiles and transportation equipment, architecture (building), and agriculture. The optical elements for use in automobiles and transportation equipment are exemplified by elements for use in automobiles, such as lamp materials, lamp reflectors, and lamp lenses for lamps such as headlamps, tail lamps (rear position lamps), and body interior lamps, a variety of interior and exterior trims such as outer casings and interior panels, glass substitutes, a variety of coating materials (coating agents), and adhesives (bonding agents); elements for use in railroad vehicles, such as exterior parts, glass substitutes, a variety of coating materials (coating agents), and adhesives (bonding agents); and elements for use in aircraft, such as exterior parts, glass substitutes, a variety of coating materials (coating agents), and adhesives (bonding agents). The optical elements for use in architecture are exemplified by glass-interlayer films, glass substitutes, a variety of coating materials (coating agents), and adhesives (bonding agents). The optical elements for use in agriculture are exemplified by films for plastic greenhouses, a variety of coating materials (coating agents), and adhesives (bonding agents).

The use of the optical element including the cured product [1] can give an optical device including the optical element, where the cured product [1] is obtained by curing the curable composition [1] (composition for optical element formation) according to the present invention. The optical device is exemplified by, but not limited to, a variety of optical devices including any of the above-mentioned optical elements, such as liquid crystal display devices, optical semiconductor display devices, plasma display panels, organic electroluminescence displays, field emission displays, and portable terminals such as smartphones and mobile phones.

Curable Composition [2] According to Present Invention

The curable composition [2] according to the present invention is a curable composition for a wafer-level lens, where the curable composition includes a cycloaliphatic epoxide (A') as an essential component, as described above. The curable composition [2] according to the present invention preferably further includes a siloxane (B). The curable composition [2] according to the present invention is a curable composition suitable for the formation of a wafer-level lens. The curable composition [2] according to the present invention may further include one or more components other than those mentioned above.

Cycloaliphatic Epoxide (A')

The cycloaliphatic epoxide (A') acts as an essential component of the curable composition [2] according to the present invention and is a compound represented by Formula (I). The cycloaliphatic epoxide (A') is exemplified as with the cycloaliphatic epoxide (A') described in the description of the curable composition [1] according to the present invention.

The curable composition [2] according to the present invention may include, as the cycloaliphatic epoxide (A'), each of different epoxides alone or in combination. The cycloaliphatic epoxide (A') may be produced by a known or common method. The cycloaliphatic epoxide (A') may also be selected from commercial products available typically under the trade names of CELLOXIDE 2021P and CELLOXIDE 2081 (each from Daicel Corporation).

Among them, the cycloaliphatic epoxide (A') is preferably selected from the compound represented by Formula (I-1) [3,4-epoxycyclohexylmethyl (3,4-epoxy)cyclohexanecarboxylate, or a product available under the trade name of CELLOXIDE 2021P (from Daicel Corporation) and 3,4,3',4'-diepoxybicyclohexyl. In particular, the curable composition for a wafer-level lens preferably includes 4,3',4'-diepoxybicyclohexyl as an essential component. This is preferred from the viewpoints of the curability of the curable composition, and the water-vapor resistance, heat resistance (glass transition temperature), low shrinkage, and low linear expansion of the cured product and the wafer-level lens.

The curable composition [2] according to the present invention may contain the cycloaliphatic epoxide (A') in a content (blending quantity) not critical, but preferably from 5 to 60 percent by weight, more preferably from 10 to 55 percent by weight, and furthermore preferably from 15 to 50 percent by weight, based on the total amount (100 percent by weight) of the curable composition. The curable composition, if containing the cycloaliphatic epoxide (A') in a content out of the range, may hardly allow the cured product to have heat resistance and mechanical strength in a good balance at high levels.

In an embodiment, 3,4,3',4'-diepoxybicyclohexyl is used as the cycloaliphatic epoxide (A'). In particular in this embodiment, the curable composition [2] according to the present invention may contain the 3,4,3',4'-diepoxybicyclohexyl in an amount (blending quantity) not critical, but preferably from 10 to 50 percent by weight, more preferably from 15 to 45 percent by weight, and furthermore preferably from 20 to 40 percent by weight, based on the total amount (100 percent by weight) of curable compounds contained in the curable composition. The curable composition for a wafer-level lens, if containing 3,4,3',4'-diepoxybicyclohexyl in a content of less than 10 percent by weight, may be cured insufficiently and may cause the cured product and wafer-level lens to be insufficient in water-vapor resistance, heat resistance (glass transition temperature), low shrinkage, and/or low linear expansion in some use situations. In contrast, the curable composition, if containing 3,4,3',4'-diepoxybicyclohexyl in a content of greater than 50 percent by weight, may cause the cured product and wafer-level lens to have insufficient mechanical strength.

Siloxane (B)

The curable composition [2] according to the present invention preferably further includes a siloxane (B). As used herein the term "siloxane (B)" refers to a siloxane that contains at least two epoxy groups per molecule. The curable composition, when including the siloxane (B), can efficiently give a wafer-level lens having still higher quality. The siloxane (B) is exemplified as with the siloxane (B) described in the description of the curable composition [1] according to the present invention.

The curable composition [2] according to the present invention may include, as the siloxane (B), each of different siloxanes alone or in combination. The siloxane (B) for use herein may also be selected from commercial products available typically under the trade names of X-40-2678, X-40-2670, and X-40-2720 (each from Shin-Etsu Chemical Co., Ltd.).

The curable composition [2] according to the present invention may contain the siloxane (B) in a content (blending quantity) not critical, but preferably from 1 to 50 percent by weight, more preferably from 5 to 45 percent by weight, and furthermore preferably from 10 to 40 percent by weight, based on the total amount (100 percent by weight) of the curable composition. The curable composition, if containing the siloxane (B) in a content out of the range, may hardly allow the wafer-level lens to have heat resistance and mechanical strength in a good balance at high levels.

The curable composition [2] according to the present invention may contain the siloxane (B) in an amount (blending quantity) not critical, but preferably from 1 to 60 percent by weight, more preferably from 5 to 55 percent by weight, and furthermore preferably from 10 to 50 percent by weight, based on the total amount (100 percent by weight) of curable compounds contained in the curable composition. The total amount herein is, for example, the total amount of curable compounds such as epoxides and oxetane compounds. The curable composition, if containing the siloxane (B) in an amount out of the range, may hardly allow the wafer-level lens to have heat resistance and mechanical strength in a good balance at high levels.

Curing Agent (C)

The curable composition [2] according to the present invention may further include a curing agent (C). The curing agent (C) is a compound that functionally initiates or promotes the curing reaction of a curable compound (in particular, an epoxide), or reacts with the curable compound to cure the curable composition for a wafer-level lens, where the curable compound contains a cationically curable functional group (in particular, an epoxy group) and is exemplified by the cycloaliphatic epoxide (A') and the siloxane (B). The curing agent (C) is exemplified by known or common curing agents such as curing catalysts. The curable composition [2] according to the present invention may include, as the curing agent (C), each of different curing agents alone or in combination.

In an embodiment, a curing catalyst is used as the curing agent (C). The curing catalyst for use herein is exemplified by, but not limited to, cationic catalysts (cationic-polymerization initiators). The cationic catalysts generate a cationic species upon the application of light (in particular, an ultraviolet ray) or heat to initiate polymerization. Specifically, the curing catalyst is exemplified by photo-cationic polymerization initiators (photoacid generators) and thermal cationic polymerization initiators (thermal acid generators). In an embodiment, the curing agent (C) is a curing catalyst acting as a photo-cationic polymerization initiator or thermal cationic polymerization initiator. In this embodiment, the curable composition for a wafer-level lens may readily have excellent curability to efficiently give a cured product and a wafer-level lens each of which has smaller tack. In contrast, typically assume that the curable composition for a wafer-level lens employs, as the curing agent (C), an acid anhydride well known as a curing agent for epoxy resins. In this case, the curable composition may tend to be cured remarkably unsatisfactorily and to hardly produce a cured product and a wafer-level lens with high productivity. Specifically, the cationic catalyst is exemplified as with the cationic catalyst described in the description of the curable composition [1] according to the present invention.

In an embodiment, the curable composition [2] according to the present invention may include the curing catalyst as the curing agent (C). In this embodiment, the curable composition may contain the curing catalyst in an amount (blending quantity) not critical, but preferably from 0.01 to 15 parts by weight, more preferably from 0.01 to 10 parts by weight, furthermore preferably from 0.05 to 10 parts by weight, and particularly preferably from 0.1 to 5 parts by weight, per 100 parts by weight of the total amount of curable compounds contained in the curable composition. The curable composition, when using the curing catalyst in an amount within the range, can give a cured product and a wafer-level lens each of which excels in heat resistance, light resistance (lightfastness), and transparency.

Other Cationically Curable Compound

The curable composition [2] according to the present invention may further include one or more other cationically curable compounds. The term "other cationically curable compounds" hereinafter refers to cationically curable compounds other than the cycloaliphatic epoxide (A') and the siloxane (B). The other cationically curable compounds are exemplified by other epoxides; oxetane compounds; and vinyl ether compounds. The term "other epoxides" hereinafter refers to epoxides other than the cycloaliphatic epoxide (A') and the siloxane (B). The curable composition for a wafer-level lens, when containing the other cationically curable compound, may have a controlled viscosity to be handled more satisfactorily, and/or may become resistant to cure shrinkage upon the formation of a wafer-level lens. The curable composition [2] according to the present invention may include each of different other cationically curable compounds alone or in combination.

The other epoxides are exemplified by aromatic glycidyl ether epoxides such as bisphenol-A epoxides, bisphenol-F epoxides, biphenol epoxides, phenol novolac epoxides, cresol novolac epoxides, bisphenol-A cresol novolac epoxides, naphthalene epoxides, and epoxides derived from trisphenolmethane; aliphatic glycidyl ether epoxides such as aliphatic polyglycidyl ethers; glycidyl ester epoxides; glycidylamine epoxides; and cycloaliphatic epoxides excluding the cycloaliphatic epoxide (A') and the siloxane (B), such as compounds containing an epoxy group bonded to an alicycle directly through a single bond, and hydrogenated glycidyl ether epoxides (e.g., nuclear-hydrogenated aromatic glycidyl ether epoxides). Specific examples of the other epoxides are as with the other epoxides described in the description of the curable composition [1] according to the present invention.

Among them, oxetane compounds and hydrogenated glycidyl ether epoxides are preferred, of which hydrogenated glycidyl ether epoxides are more preferred. These are preferred from the viewpoints of the transparency, water-vapor resistance, and mechanical strength of the wafer-level lens.

The other cationically curable compounds for use herein may also be selected from commercial products available typically under the trade names of: YX8000 (from Mitsubishi Chemical Corporation); and ARON OXETANE OXT221 (from Toagosei Co., Ltd.).

The curable composition [2] according to the present invention may contain the other cationically curable compound(s) in a content (blending quantity) not critical, but preferably from 0 to 50 percent by weight (e.g., from 5 to 50 percent by weight), more preferably from 0 to 30 percent by weight (e.g., 5 to 30 percent by weight), and furthermore preferably from 0 to 15 percent by weight, based on the total amount (100 percent by weight) of the curable composition.

In an embodiment, the curable composition [2] according to the present invention includes a hydrogenated glycidyl ether epoxide. In this embodiment, the curable composition may contain the hydrogenated glycidyl ether epoxide in an amount (blending quantity) not critical, but preferably from 5 to 40 percent by weight, and more preferably from 10 to 30 percent by weight, based on the total amount (100 percent by weight) of curable compounds contained in the curable composition. The curable composition, when containing the hydrogenated glycidyl ether epoxide in a content of 5 percent by weight or more, may allow the wafer-level lens to have still higher mechanical strength. In contrast, the curable composition for a wafer-level lens, if containing the hydrogenated glycidyl ether epoxide in a content of greater than 40 percent by weight, may have poor curability in some use situations.

In an embodiment, the curable composition [2] according to the present invention includes an oxetane compound. In this embodiment, the curable composition may contain the oxetane compound in an amount (blending quantity) not critical, but preferably from 5 to 30 percent by weight, and more preferably from 5 to 20 percent by weight, based on the total amount (100 percent by weight) of curable compounds contained in the curable composition. The curable composition for a wafer-level lens, when containing the oxetane compound in a content of 5 percent by weight or more, may be cured still more satisfactorily, particularly upon curing by ultraviolet irradiation. In contrast, the curable composition for a wafer-level lens, if containing the oxetane compound in a content of greater than 30 percent by weight, may cause poor heat resistance in some use situations.

Mold-Release Agent

The curable composition [2] according to the present invention may contain a mold-release agent. The curable composition, when containing the mold-release agent, may tend to be readily released from a wafer-level-lens mold. The mold-release agent is exemplified by, but not limited to, known or common mold-release agents including fluorine compounds (fluorine mold-release agents) such as fluorocarbon resins and fluoroalkyl-containing compounds; silicone compounds (silicone mold-release agents) such as silicone oils and silicone resins; waxes such as polyethylene waxes and polypropylene waxes; long-chain carboxylic acids; long-chain carboxylic acid metal salts; and polyhydric alcohols such as polyethylene glycols. Among them, preferred are mold-release agents containing at least one cationically curable functional group (e.g., epoxy group and/or oxetanyl group) per molecule. These mold-release agents are exemplified by fluorine compounds each containing a cationically curable functional group; and silicone compounds each containing a cationically curable functional group. The curable composition may include, as the mold-release agent, each of different agents alone or in combination. The mold-release agent for use herein may also be selected from commercial products available typically under the trade name of E-1630 (from Daikin Industries Ltd.). The curable composition [2] according to the present invention may contain the mold-release agent in a content not critical, but preferably from 0.1 to 10 percent by weight, and more preferably from 0.5 to 5 percent by weight, based on the total amount (100 percent by weight) of the curable composition, although the content may be set as appropriate depending typically on the type of the mold-release agent and molding method.

Additives and Other Components

The curable composition [2] according to the present invention may include one or more other components such as additives. The additives are exemplified by, but not limited to, known or common additives such as metal oxide particles, rubber particles, silicone- or fluorine-antifoaming agents, silane coupling agents, fillers, plasticizers, leveling agents, antistatic agents, flame retardants, colorants, antioxidants, ultraviolet absorbers, ion adsorbents, and pigments. The curable composition [2] according to the present invention may contain such additive or additives each in a content (blending quantity) not critical, but preferably 5 percent by weight or less, based on the total amount (100 percent by weight) of the curable composition. The curable composition [2] according to the present invention may include a solvent. However, the solvent, if present in an excessively high content, may cause the wafer-level lens to include bubbles. To prevent this, the content of the solvent is preferably controlled to 10 percent by weight or less, and more preferably 1 percent by weight or less, based on the total amount (100 percent by weight) of the curable composition [2] according to the present invention.

The curable composition [2] according to the present invention preferably excludes a composition including the monoallyl diglycidyl isocyanurate compound represented by Formula (2). The curable composition [2] according to the present invention, if including the monoallyl diglycidyl isocyanurate compound represented by Formula (2), may tend to be cured unsatisfactorily, and this may often impede the preparation of a wafer-level lens without tack. In addition, this curable composition may readily cause disadvantages such as warping of the resulting wafer-level lens. The curable composition may also tend to hardly allow the resulting wafer-level lens to have eccentric precision (molding precision) at certain level.

The curable composition [2] according to the present invention may be prepared by a process that is exemplified by, but not limited to, a process of formulating predetermined amounts of the cycloaliphatic epoxide (A'), and, as needed, optional components such as the siloxane (B), the curing agent (C), and other components, and stirring and mixing them. The stirring-mixing may be performed while removing bubbles typically in vacuo according to necessity. The stirring-mixing is performed at a temperature of typically preferably from about 10° C. to about 60° C. The stirring-mixing may employ a known or common apparatus such as planetary centrifugal mixers, single- or multi-screw extruders, planetary mixers, kneaders, and dissolvers.

The curable composition [2] according to the present invention can be cured satisfactorily and, when cured, can give a cured product that has a high glass transition temperature as maintained and still has high mechanical strength. This cured product is hereinafter also referred to as "cured product [2] according to the present invention". The curing of the curable composition [2] according to the present invention may be allowed to proceed typically by a method described in the description of the method for producing a wafer-level lens mentioned below.

The cured product [2] according to the present invention may have an internal transmittance at 400 nm [for a thickness of 0.5 mm] not critical, but preferably 70% or more (e.g., from 70% to 100%), more preferably 75% or more, furthermore preferably 80% or more, and particularly preferably 85% or more. The cured product [2] according to the present invention may have a refractive index not critical, but preferably from 1.40 to 1.60, and more preferably from 1.45 to 1.55. The cured product [2] according to the present invention may have an Abbe number not critical, but preferably 45 or more, and more preferably 50 or more.

The cured product [2] according to the present invention may have a glass transition temperature (Tg) not critical, but preferably 100° C. or higher (e.g., from 100° C. to 200° C.), and more preferably 140° C. or higher. The curable composition, if having a glass transition temperature of lower than 100° C., may cause the cured product to have insufficient heat resistance in some use situations. The glass transition temperature of the cured product may be measured typically by any of techniques such as a variety of thermal analyses [e.g., DSC (differential scanning calorimeter) and TMA (thermomechanical analyzer)]; and dynamic viscoelastic measurement. More specifically, the glass transition temperature may be measured by the measurement method described in the working examples.

The cured product [2] according to the present invention may have a linear expansion coefficient ($\alpha$1) not critical, but preferably from 40 to 100 ppm/° C., and more preferably from 40 to 90 ppm/° C. The linear expansion coefficient ($\alpha$1) is one at temperatures equal to or lower than the glass transition temperature. The cured product [2] according to the present invention may have a linear expansion coefficient $\alpha$2 not critical, but preferably from 90 to 150 ppm/° C., and more preferably from 90 to 130 ppm/° C. The linear expansion coefficient $\alpha$2 is one at temperature equal to or higher than the glass transition temperature. The linear expansion coefficients $\alpha$1 and $\alpha$2 of the cured product may be measured typically by TMA and, more specifically, may be measured by the measurement method described in the working examples.

The cured product [2] according to the present invention may have a storage elastic modulus at 25° C. not critical, but preferably 0.1 GPa or more, and more preferably 1 GPa or more. The storage elastic modulus of the cured product at 25° C. may be measured typically by dynamic viscoelastic measurement and, more specifically, may be measured by the measurement method described in the working examples.

The cured product [2] according to the present invention may have a bending strength at 25° C. not critical, but preferably from 80 to 200 MPa, and more preferably from 100 to 200 MPa. The cured product [2] according to the present invention may have a bending strain at 25° C. not critical, but preferably 2% or more, and more preferably 3% or more. The bending strain refers to a train at the maximum bending stress. The bending strength and bending strain of the cured product at 25° C. may be measured typically in conformity with JIS K7171 and, more specifically, may be measured by the measurement method described in the working examples.

Method for Producing Wafer-Level Lens

The curable composition [2] according to the present invention, when cured and molded, gives a wafer-level lens. The resulting wafer-level lens is hereinafter also referred to as "wafer-level lens according to the present invention". Specifically, the wafer-level lens according to the present invention may be obtained by a method for producing a wafer-level lens according to the present invention. This method includes subjecting the curable composition [2] according to the present invention to cast molding or injection molding.

The molding of the wafer-level lens may employ a mold (wafer-level-lens mold). The mold may be made of any material that is exemplified by, but not limited to, metals, glass, and plastics.

Cast Molding

A way to perform the cast molding is exemplified by a method including steps 1a, 2a, and 3a as follows.

The step 1a is the step of preparing a wafer-level-lens mold including at least one lens pattern.

The step 2a is performed after the step 1a and is the step of bringing the curable composition [2] according to the present invention into contact with the wafer-level-lens mold.

The step 3a is performed after the step 2a and is the step of applying heat (heat treatment) and/or light (light irradiation) to the curable composition [2] according to the present invention to cure the curable composition to thereby give a cured product of the curable composition.

The curing of the curable composition [2] according to the present invention is performed by the heat treatment and/or light irradiation (step 3a). The heat treatment, when employed, may be performed at a temperature not critical, but preferably from 100° C. to 200° C., and more preferably from about 120° C. to about 160° C., although the temperature may be adjusted as appropriate depending typically on the types of the components and catalyst to be subjected to the reaction. The light irradiation, when performed, may employ a light source. The light source for use herein is exemplified by mercury lamps, xenon lamps, carbon arc lamps, metal halide lamps, sunlight, electron beam sources, and laser sources. After the light irradiation, heat treatment may be performed typically at a temperature of from about 50° C. to about 180° C. to allow the curing reaction to further proceed.

The cast molding may further include, after the step 3a, a step 4a as follows.

The step 4a is the step of annealing the cured product (cured product [2]) of the curable composition [2] according to the present invention.

The annealing may be performed typically, but nonlimitatively by heating at a temperature of from 100° C. to 200° C. for about 30 minutes to about one hour. Before the annealing, the cured product may be demolded from the wafer-level-lens mold, or not.

In an embodiment, the cast molding is performed by simultaneous molding as mentioned below. In particular in this embodiment, the step 3a or step 4a generally gives a wafer-level-lens sheet. The wafer-level-lens sheet refers to a cured product that is in the form of a sheet and includes one or more wafer-level lenses formed adjacent to each other. In an embodiment, the wafer-level-lens sheet includes two or more wafer-level lenses. These wafer-level lenses may be arrayed regularly or may be disposed randomly. The wafer-level-lens sheet, when cut and from which an extra portion is removed, gives the wafer-level lens or lenses according to the present invention.

Specifically, in an embodiment, the cast molding is performed by the simultaneous molding. In particularly in this embodiment, the cast molding may further include, after the step 3a or the step 4a, a step 5a as follows.

The step 5a is the step of cutting the cured product (the cured product [2], in general, the wafer-level-lens sheet) of the curable composition [2] according to the present invention.

The cutting of the cured product (the cured product [2]) of the curable composition [2] according to the present invention may be performed typically by a known or common proceeding process.

More specifically, the way to perform the cast molding includes both the simultaneous molding including steps 1-1, 1-2, and 1-3 as follows; and single-piece molding including steps 2-1 and 2-2 as follows.

Simultaneous Molding

The step 1-1 is the step of pouring or casting the curable composition [2] according to the present invention into a wafer-level-lens mold, where the mold includes two or more lens patterns arrayed in a predetermined direction in form; and applying heat and/or light to the curable composition to cure the curable composition to give a cured product.

The step 1-2 is performed after the step 1-1 and is the step of demolding the cured product from the wafer-level-lens mold and annealing the cured product to give a wafer-level-lens sheet as a cured product including two or more wafer-level lenses bound with each other.

The step 1-3 is performed after the step 1-2 and is the step of cutting the resulting cured product to give wafer-level lenses.

Single-Piece Molding

The step 2-1 is the step of pouring or casting the curable composition [2] according to the present invention into a wafer-level-lens mold including one lens pattern; and applying heat and/or light to the curable composition to cure the curable composition to thereby give a cured product.

The step 2-2 is performed after the step 2-1 and is the step of demolding the cured product from the wafer-level-lens mold and annealing the cured product to give a wafer-level lens.

Injection Molding

The injection molding is exemplified by a process including steps 1b, 2b, and 3b, as follows.

The step 1b is the step of preparing a wafer-level-lens mold including at least one lens pattern.

The step 2b is performed after the step 1b and is the step of injecting the curable composition [2] according to the present invention into the wafer-level-lens mold.

The step 3b is performed after the step 2b and is the step of applying heat and/or light to the curable composition [2] according to the present invention to cure the curable composition to thereby give a cured product.

In the injection molding, the curable composition [2] according to the present invention is cured by the application of heat (heat treatment) and/or light (light irradiation). More specifically, the curable composition may be cured as in the curing in the cast molding.

The injection molding may further include, after the step 3b, a step 4b as follows.

The step 4b is the step of annealing the cured product (the cured product [2]) of the curable composition [2] according to the present invention.

The annealing may be performed typically, but nonlimitatively by heating at a temperature of from 100° C. to 200° C. for about 30 minutes to about one hour. Before the annealing, the cured product may be demolded from the wafer-level-lens mold, or not.

The injection molding may further include, after the step 3b or the step 4b, an additional step such as the step of removing burrs.

Assume that the curable composition [2] according to the present invention is subjected to the simultaneous molding in the cast molding. In this case, the curable composition preferably has a low viscosity and exhibits excellent fluidity (flowability). This is preferred because the curable composition can be satisfactorily charged into the wafer-level-lens mold. The curable composition [2] according to the present invention, when subjected to the simultaneous molding, may have a viscosity at 25° C. not critical, but preferably 3600 mPa·s or less, more preferably 2500 mPa·s or less, furthermore preferably 2000 mPa·s or less, and particularly preferably 1500 mPa·s or less. The curable composition [2] according to the present invention, when having a viscosity controlled within the range, can have better fluidity, may less cause bubbles to remain, and can be charged into the wafer-level-lens mold while inhibiting the injection pressure from increasing. Specifically, the curable composition [2] according to the present invention can be coated (applied) and charged more satisfactorily and can contribute to better workability all through the molding operation of the curable composition.

The cured product (cured product [2]) of the curable composition [2] according to the present invention has excellent heat resistance even in a high-temperature environment at a temperature of from about 100° C. to 200° C. and can satisfactorily retain its shape. For this reason, the cured product, even when annealed after being demolded from the wafer-level-lens mold, can efficiently produce a wafer-level lens having excellent positional precision of the lens center. The positional precision of the lens center may be such that the positional deviation (misregistration) of the lens center is preferably about ±2 μm or less, and more preferably about ±1 μm or less. In an embodiment, two or more wafer-level lenses obtained by the method for producing a wafer-level lens according to the present invention are stacked and bonded to give a wafer-level lens stack. The wafer-level lens stack is a cemented lens that includes pixels in an extremely large number and has excellent optical properties.

The cured product (cured product [2]) of the curable composition [2] according to the present invention can satisfactorily retain its shape even in a high-temperature environment, as mentioned above. The cured product therefore does not suffer from displacement in lens pitch even during or after annealing. In the step 1-3 of the simultaneous molding, two or more cured products are stacked to give an assembly, the cutting line or lines are determined based on the uppermost cured product, and the assembly is cut. This allows two or more wafer-level lenses to be separated from each other without failure and enables cost reduction and more efficient operation.

The wafer-level lens according to the present invention is usable also as a constitutional element of a wafer-level lens stack. The "wafer-level lens stack" herein refers to an assembly of two or more wafer-level lenses as stacked. Specifically, the wafer-level lens stack according to the present invention is a wafer-level lens stack including the wafer-level lens according to the present invention as a wafer-level lens constituting the stack. The wafer-level lens stack according to the present invention may include, as wafer-level lenses, the wafer-level lenses according to the present invention alone, or one or more of the wafer-level lenses according to the present invention in combination with one or more other wafer-level lenses. The wafer-level lens stack according to the present invention may include wafer-level lenses in a number not critical, but typically from 2 to 5, and particularly 2 or 3.

The wafer-level lens stack according to the present invention may be produced by a known or common method not limited. Typically, the wafer-level lens stack may be produced by stacking two or more wafer-level lenses including at least one wafer-level lens according to the present invention, or by stacking two or more wafer-level-lens sheets including at least one wafer-level-lens sheet obtained by the simultaneous molding to give a wafer-level-lens sheet stack (assembly of wafer-level-lens sheets) and cutting the wafer-level-lens sheets. In the wafer-level lens stack (or the wafer-level-lens sheet stack) according to the present invention, adjacent wafer-level lenses (or adjacent wafer-level-lens sheets) may be bonded by a known or common bonding process or tool, or not.

More specifically, the wafer-level lens stack according to the present invention may be produced typically by a method including steps 1c, 2c, 3c, 4c, and 5c as follows.

The step 1c is the step of preparing a wafer-level-lens mold including at least one lens pattern.

The step 2c is performed after the step 1c and is the step of bringing the curable composition [2] according to the present invention into contact with the wafer-level-lens mold.

The step 3c is performed after the step 2c and is the step of applying heat and/or light to the curable composition [2] according to the present invention to cure the curable composition to thereby give a wafer-level-lens sheet.

The step 4c is performed after the step 3c and is the step of stacking two or more wafer-level-lens sheets including the above-prepared wafer-level-lens sheet to give a wafer-level-lens sheet stack.

The step 5c is performed after the step 4c and is the step of cutting the wafer-level-lens sheet stack.

The method for producing a wafer-level lens stack may further include, between the step 3c and the step 4c, a step 6c as follows.

The step 6c is the step of annealing the wafer-level-lens sheet.

The wafer-level lens and wafer-level lens stack according to the present invention have excellent heat resistance and optical properties and can satisfactorily retain their shapes and maintain excellent optical properties even upon exposure to a high-temperature environment. The wafer-level lens and wafer-level lens stack are preferably usable typically as image pickup lenses for cameras in a variety of optical devices; ophthalmic lenses; light-beam condenser lenses; and light diffusing lenses. The cameras are exemplified by car-mounted cameras, digital cameras, personal computer-use cameras, mobile phone-use cameras, and security cameras (surveillance cameras). The optical device including the wafer-level lens or wafer-level lens stack according to the present invention has high quality.

The wafer-level lens and wafer-level lens stack according to the present invention, when mounted onto a circuit board, can be mounted by reflow soldering. Assume that the wafer-level lens according to the present invention is mounted to a camera module. Further assume that the camera module is mounted onto a printed circuit board (PCB) substrate typically of a mobile phone. In this case, the camera module can be very efficiently mounted directly onto the substrate by the same solder reflow process as with surface mounting of other electronic components. This enables extremely efficient production of an optical device.

EXAMPLES

The present invention will be illustrated in further detail with reference to several examples (working examples) below. It should be noted, however, that the examples are by no means intended to limit the scope of the present invention.

Production Example 1

Production of Cycloaliphatic Epoxide

An aliquot (70 g (0.68 mol)) of 95 percent by weight sulfuric acid and 55 g (0.36 mol) of 1,8-diazabicyclo[5.4.0]undecene-7 (DBU) were mixed with stirring to give a dehydration catalyst.

In a 3-liter flask equipped with a stirrer, a thermometer, and a dewatering tube and further equipped with a thermally-insulated distilling piping, were placed 1000 g (5.05 mol) of hydrogenated biphenol (4,4'-dihydroxybicyclohexyl), 125 g (0.68 mol as sulfuric acid) of the above-prepared dehydration catalyst, and 1500 g of pseudocumene, followed by heating of the flask. Water formation was detected around the time point when the internal temperature became higher than 115° C. The temperature was further raised up to the boiling point of pseudocumene (an internal temperature of from 162° C. to 170° C.), followed by a dehydration reaction under normal atmospheric pressure. The by-produced water was distilled and discharged through the dewatering tube out of the system. The dehydration catalyst was liquid under the reaction conditions and finely dispersed in the reaction mixture. After a lapse of 3 hours, an approximately stoichiometric amount (180 g) of water was distilled, and the reaction was completed. The reaction mixture after the completion of reaction was subjected to distilling off of pseudocumene and subsequently to distillation at an internal temperature of from 137° C. to 140° C. and an internal pressure of 10 Torr (1.33 kPa) using an Oldershaw distillation column with ten trays, and yielded 731 g of bicyclohexyl-3,3'-diene. In a reactor, were charged 243 g of the obtained bicyclohexyl-3,3'-diene and 730 g of ethyl acetate. The resulting mixture was combined with 274 g of a 3U percent by weight peracetic acid solution in ethyl acetate (with a water content of 0.41 percent by weight) added dropwise over about 3 hours. The dropwise addition was performed while blowing nitrogen into the gas phase and while controlling the reaction system internal temperature to be 37.5° C. After the completion of dropwise addition of the peracetic acid solution, the resulting mixture was aged at 40° C. for one hour, followed by reaction completion. The crude reaction mixture at the completion of reaction was further washed with water at 30° C., from which low-boiling compounds were removed at 70° C. and 20 mmHg, and yielded 270 g of a cycloaliphatic epoxide. The resulting cycloaliphatic epoxide had an oxirane oxygen content of 15.0 percent by weight. The cycloaliphatic epoxide was subjected to $^1$H-NMR measurement to find that a peak at 6 of around 4.5 to 5 ppm disappeared, where the peak is assigned to a double bond; and that a proton peak assigned to an epoxy group was detected at 5 of around 3.1 ppm. Thus, the cycloaliphatic epoxide was identified as 3,4,3',4'-diepoxybicyclohexyl.

Examples 1-1 to 1-8 and Comparative Examples 1-1 to 1-7

Components given in Table 1 below were blended according to blending formulations given in Table 1 (in part by weight), stirred and mixed at room temperature using a planetary centrifugal mixer, and yielded uniform and transparent curable compositions (cationically curable compositions).

Examples 2-1 to 2-8 and Comparative Examples 2-1 to 2-7

Components given in Table 2 below were blended according to blending formulations given in Table 2 (in part by weight), stirred and mixed at room temperature using a planetary centrifugal mixer, and yielded uniform and transparent curable compositions (cationically curable compositions) for a wafer-level lens.

Next, the above-obtained curable compositions or curable compositions for a wafer-level lens were cured by a heating treatment method or an UV irradiation method as follows, and yielded cured products. Tables 1 and 2 indicate which curing method was employed for curing of each curable composition. For Examples 1-1 to 1-8 and Comparative Examples 1-1 to 1-7, a flat mold without lens pattern was used for the preparation of the cured products. In contrast, for Examples 2-1 to 2-8 and Comparative Examples 2-1 to 2-7, a mold (wafer-level-lens mold) including seven aspherical lens patterns at the center thereof was used for the preparation of samples (cured products) for release properties and lens positional deviation evaluation; and a flat mold without lens pattern was used for the preparation of samples (cured products) for other evaluations.

Heating Treatment Method

Each of the sample curable compositions was cured and molded to a thickness of 0.5 mm in a molding profile below using an imprint molding machine (trade name NANOIM-PRINTER NM-0501, supplied by Meisho Kiko Co.), cooled down to 80° C., demolded, further heated and thereby annealed for 30 minutes in an oven preheated at 160° C., and yielded cured products (five cured products for each curable composition).

The molding profile was such that the curable composition is applied to the mold at 25° C., the press shaft position is adjusted so as to give a predetermined thickness, the mold is pressed, raised in temperature up to 150° C. at a rate of 20° C. per minute, and held at 150° C. for 5 minutes.

UV Irradiation Method

Each of the sample curable compositions is cured and molded to a thickness of 0.5 mm in a molding profile below using an imprint molding machine (trade name NANOIM-PRINTER NM-0501, supplied by Meisho Kiko Co.), demolded, further heated and thereby annealed for 30 minutes in an oven preheated at 160° C., and yielded cured products (five cured products for each curable composition).

The molding profile was such that the sample curable composition is applied to the mold at 25° C., the press shaft position is adjusted so as to give a predetermined thickness, the mold is pressed, and an ultraviolet ray is applied at an irradiation intensity of from 10 to 50 mW/cm and a cumulative dose of from 2500 to 5000 mJ/cm$^2$.

Independently, test specimens (cured products) for the measurement of bending strength and bending strain below were prepared by the methods described in the heating treatment method and the UV irradiation method, except that each sample curable composition was cured and molded to a thickness of 1 mm.

TABLE 1

| Formulation of curable composition | | Ex. 1-1 | Ex. 1-2 | Ex. 1-3 | Ex. 1-4 | Ex. 1-5 | Ex. 1-6 | Ex. 1-7 | Ex. 1-8 | Com. Ex. 1-1 | Com. Ex. 1-2 | Com. Ex. 1-3 | Com. Ex. 1-4 | Com. Ex. 1-5 | Com. Ex. 1-6 | Com. Ex. 1-7 |
|---|---|---|---|---|---|---|---|---|---|---|---|---|---|---|---|---|
| Curable compound | S-1 | 30 | 20 | 20 | 30 | 40 | 20 | 20 | — | — | — | — | — | — | — | — |
| | S-2 | — | — | — | — | — | — | — | 30 | — | — | — | — | — | — | — |
| | C-1 | 40 | 30 | 50 | 40 | 30 | 30 | 30 | 35 | 10 | 30 | — | 30 | — | 40 | 30 |
| | CELLOXIDE 2021P | 15 | — | — | — | — | — | — | — | 50 | 15 | 50 | 20 | 70 | 25 | 25 |
| | YX8000 | 15 | 35 | 30 | 20 | 30 | 15 | 15 | 20 | — | 20 | 30 | 30 | — | — | — |
| | OXT221 | — | 15 | — | — | — | 15 | 15 | 15 | 20 | 15 | — | — | — | 15 | 15 |
| | EHPE3150 | — | — | — | 10 | — | 20 | 20 | — | 20 | 20 | 20 | 20 | 30 | 20 | 30 |
| Thermal cationic polymerization initiator | SI60L | 0.31 | — | 0.31 | 0.31 | 0.31 | — | — | — | 0.31 | — | 0.31 | 0.31 | 0.31 | — | — |
| Photo-cationic polymerization initiator | CPI101A | — | 0.45 | — | — | — | 0.45 | 0.45 | 0.45 | — | 0.45 | — | — | — | 0.45 | 0.45 |
| Antioxidant | IRG1010 | 1 | 1 | 1 | 1 | 1 | 1 | 1 | 1 | 1 | 1 | 1 | 1 | 1 | 1 | 1 |
| | HP10 | 1 | 1 | 1 | 1 | 1 | 1 | 1 | 1 | 1 | 1 | 1 | 1 | 1 | 1 | 1 |
| Curing method | | heat | UV | heat | heat | heat | UV | UV | UV | heat | UV | heat | heat | heat | UV | UV |

TABLE 2

| Formulation of curable composition for wafer-level lens | | Ex. 2-1 | Ex. 2-2 | Ex. 2-3 | Ex. 2-4 | Ex. 2-5 | Ex. 2-6 | Ex. 2-7 | Ex. 2-8 | Com. Ex. 2-1 | Com. Ex. 2-2 | Com. Ex. 2-3 | Com. Ex. 2-4 | Com. Ex. 2-5 | Com. Ex. 2-6 | Com. Ex. 2-7 |
|---|---|---|---|---|---|---|---|---|---|---|---|---|---|---|---|---|
| Curable compound | S-1 | 30 | 20 | 20 | 30 | 40 | 20 | 20 | — | — | — | — | — | — | — | — |
| | S-2 | — | — | — | — | — | — | — | 30 | — | — | — | — | — | — | — |

TABLE 2-continued

| Formulation of curable composition for wafer-level lens | | Ex. 2-1 | Ex. 2-2 | Ex. 2-3 | Ex. 2-4 | Ex. 2-5 | Ex. 2-6 | Ex. 2-7 | Ex. 2-8 | Com. Ex. 2-1 | Com. Ex. 2-2 | Com. Ex. 2-3 | Com. Ex. 2-4 | Com. Ex. 2-5 | Com. Ex. 2-6 | Com. Ex. 2-7 |
|---|---|---|---|---|---|---|---|---|---|---|---|---|---|---|---|---|
| | C-1 | 40 | 30 | 50 | 40 | 30 | 30 | 30 | 35 | 10 | 30 | — | 30 | — | 40 | 30 |
| | CELLOXIDE 2021P | 15 | — | — | — | — | — | — | — | 50 | 15 | 50 | 20 | 70 | 25 | 25 |
| | YX8000 | 15 | 35 | 30 | 20 | 30 | 15 | 15 | 20 | — | 20 | 30 | 30 | — | — | — |
| | OXT221 | — | 15 | — | — | — | 15 | 15 | 15 | 20 | 15 | — | — | — | 15 | 15 |
| | EHPE3150 | — | — | — | 10 | — | 20 | 20 | — | 20 | 20 | 20 | 20 | 30 | 20 | 30 |
| Thermal cationic polymerization initiator | SI60L | 0.31 | — | 0.31 | 0.31 | 0.31 | — | — | — | 0.31 | — | 0.31 | 0.31 | 0.31 | — | — |
| Photo-cationic polymerization initiator | CPI101A | — | 0.45 | — | — | — | 0.45 | 0.45 | 0.45 | — | 0.45 | — | — | — | 0.45 | 0.45 |
| Antioxidant | IRG1010 | 1 | 1 | 1 | 1 | 1 | 1 | 1 | 1 | 1 | 1 | 1 | 1 | 1 | 1 | 1 |
| | HP10 | 1 | 1 | 1 | 1 | 1 | 1 | 1 | 1 | 1 | 1 | 1 | 1 | 1 | 1 | 1 |
| Mold-release agent | E-1630 | 3 | 3 | 3 | 3 | 3 | 3 | 3 | 3 | 3 | 3 | 3 | 3 | 3 | 3 | 3 |
| Curing method | | heat | UV | heat | heat | heat | UV | UV | UV | heat | UV | heat | heat | heat | UV | UV |

The abbreviations used in Tables 1 and 2 will be described below.

Curable Compounds

S-1: Cyclic siloxane containing four cycloaliphatic epoxy groups per molecule (trade name X-40-2670, supplied by Shin-Etsu Chemical Co., Ltd.);

S-2: Cyclic siloxane containing two cycloaliphatic epoxy groups per molecule (trade name X-40-2678, supplied by Shin-Etsu Chemical Co., Ltd.);

C-1: Compound prepared in Production Example 1 (3,4,3',4'-diepoxybicyclohexyl);

CELLOXIDE 2021P: 3,4-Epoxycyclohexylmethyl (3,4-epoxy)cyclohexanecarboxylate (trade name CELLOXIDE 2021P, supplied by Daicel Corporation);

YX8000: Non-ester hydrogenated bisphenol diglycidyl compound (trade name YX8000, supplied by Mitsubishi Chemical Corporation);

OXT221: 3-Ethyl-3{[(3-ethyloxetan-3-yl)methoxy]methyl}oxetane (trade name ARON OXETANE OXT221, supplied by Toagosei Co., Ltd.); and EHPE3150: 1,2-Epoxy-4-(2-oxiranyl)cyclohexane adduct of 2,2-bis(hydroxymethyl)-1-butanol (trade name EHPE3150, supplied by Daicel Corporation)

Thermal Cationic Polymerization Initiator

SI60L: Aromatic sulfonium salt (trade name San-Aid SI-60L, supplied by SANSHIN CHEMICAL INDUSTRY CO., LTD.) Photo-cationic Polymerization Initiator CPI101A: Aromatic sulfonium salt (trade name CPI-101A, supplied by San-Apro Ltd.)

Antioxidants

IRG1010: Pentaerythritol tetrakis[3-(3,5-di-t-butyl-4-hydroxyphenol)propionate] (trade name IRGANOX 1010, supplied by BASF SE); and HP10: 2,2'-Methylenebis(4,6-di-t-butylphenyl)octyl phosphite (trade name HP-10, supplied by ADEKA CORPORATION) Mold-release Agent E-1630: 3-Perfluorohexyl-1,2-epoxypropane (trade name E-1630, supplied by Daikin Industries Ltd.)

The curable compositions for a wafer-level lens obtained in Examples 2-1 to 2-8 and Comparative Examples 2-1 to 2-7 were cured and molded using the mold including seven aspherical lens patterns at the center thereof by the procedure described in the heating treatment method or the UV irradiation method to give cured products (molded articles). Moldability (release properties and lens positional deviation) upon this process was evaluated.

Release Properties

A sample was molded by the procedure described in the heating treatment method or the UV irradiation method and demolded. The release properties upon demolding were evaluated according to criteria as follows.

Good: No release failure (e.g., molded article cracking) occurred upon five continuous molding procedures;

Fair: Release failure (e.g., molded article cracking) occurred in one out of five continuous molding procedures; and Poor: Release failure (e.g., molded article cracking) occurred in two or more out of five continuous molding procedures.

Lens Positional Deviation

Cured products (molded articles) were obtained by the procedure described in the heating treatment method or the UV irradiation method. The center positions of seven lenses on each cured product were measured using an image measurement system (trade name IM-6020, supplied by Keyence Corporation). Positional deviation amounts of the seven lens centers from a mold design value were measured, and averaged.

The curable compositions and cured products of them obtained in the examples and comparative examples were subjected to evaluations as follows.

Warping after Annealing

The cured products obtained in the examples and comparative examples using the flat mold were visually observed immediately after production (immediately after annealing), and whether they underwent warping after annealing was evaluated. Specifically, a sample found to suffer from no warping is indicated as "absence" (without warping after annealing); and a sample found to suffer from warping is indicated as "presence" (with warping after annealing).

Conversion after Primary Curing

Each of the curable compositions (those including the thermal cationic polymerization initiator) obtained in the examples and comparative examples was heated under a temperature condition below in a nitrogen atmosphere using a differential scanning calorimeter (DSC) (trade name Q2000, supplied by TA Instruments). In this process, the heat generated by curing of the curable composition was measured and defined as a "heat generated by curing of curable composition". Next, each of the curable compositions (those including the thermal cationic polymerization initiator) obtained in the examples and comparative examples was cured by the heating treatment method excluding the annealing and yielded a cured product (cured resin after primary curing; cured resin before annealing). The cured product was further heated under the temperature condition below. In this process, the heat generated by curing of the cured product was measured and defined as a "heat generated by curing of cured resin after primary curing". Based on these, a curing rate after molding (conversion after primary curing) was calculated according to a formula as follows.

Temperature Condition

The sample is held at 50° C. for 3 minutes, subsequently raised in temperature at a rate of 20° C. per minute, and held at 250° C. for 3 minutes.

Computational Formula for Curing Rate after Molding

Curing rate (%) after molding=[1−(Heat generated by curing of cured resin after primary curing)/(Heat generated by curing of curable composition)]×100

Conversion after Secondary Curing

Each of the curable compositions (those including the thermal cationic polymerization initiator) obtained in the examples and comparative examples was heated under a temperature condition below in a nitrogen atmosphere using a differential scanning calorimeter (DSC) (trade name Q2000, supplied by TA Instruments). In this process, the heat generated by curing of the curable composition was measured and defined as a "heat generated by curing of curable composition". Next, the cured resin after the primary curing was further subjected to annealing at 160° C. for 30 minutes and yielded a cured product (cured resin after secondary curing; cured resin after annealing). The cured product was further heated under a temperature condition below. In this process, the heat generated by curing of the cured product was measured and defined as a "heat generated by curing of cured resin after secondary curing". Based on these, a curing rate after annealing (conversion after secondary curing) was calculated according to a formula as follows.

Temperature Condition

The sample is held at 50° C. for 3 minutes, subsequently raised in temperature at a rate of 20° C. per minute, and held at 250° C. for 3 minutes.

Computational Formula for Curing Rate after Annealing

Curing rate (%) after annealing=[1−(Heat generated by curing of cured resin after secondary curing)/(Heat generated by curing of curable composition)]×100

Exothermic Onset Temperature

Each of the curable compositions (those including the thermal cationic polymerization initiator) obtained in the examples and comparative examples was heated under a heat condition below in a nitrogen atmosphere using a differential scanning calorimeter (DSC) (trade name Q2000, supplied by TA Instruments). In this process, the heat generated by curing of the curable composition was measured and defined as a "heat generated by curing of curable composition". Based on this, a temperature at which the heat generation initiated was measured and is indicated in "Exothermic onset temperature (° C.)" in Tables 3 and 4.

Temperature Condition

The sample is held at 50° C. for 3 minutes, subsequently raised at a rate of 20° C. per minute, and held at 250° C. for 3 minutes.

Time-to-Storage Elastic Modulus of $1\times10^4$ Pa

Each of the curable compositions (those including the photo-cationic polymerization initiator) obtained in the examples and comparative examples was subjected to UV irradiation. In this process, the viscoelastic behavior of the curable composition was measured using a viscoelastometer (rheometer) (trade name MCR301, supplied by Anton Paar Japan K.K.) and a UV irradiator (trade name LC8, supplied by Hamamatsu Photonics K.K.). Based on this, the reaction rate (curability) of the sample was evaluated. Specifically, a point at which the storage elastic modulus reached $1\times10^4$ Pa was employed as an index for a gel point. A time from the beginning of UV irradiation until the storage elastic modulus reached $1\times10^4$ Pa was measured as a time after UV irradiation. The analysis by the rheometer was performed under conditions as follows.

Measurement mode: Oscillating mode
Measurement plate shape: Parallel (12 mm in diameter)
Measurement temperature: 25° C.
Measurement frequency: 1 Hz
Measurement strain: 0.1%

Curing Initiation Time

Each of the curable compositions obtained in the examples and comparative examples (those including the photo-cationic polymerization initiator) was irradiated with an ultraviolet ray (UV), and a time from the beginning of UV irradiation until the phase angle began to decrease from 90 degrees was measured using a viscoelastometer (trade name MCR301, supplied by Anton Paar Japan K.K.) and a UV irradiator (trade name LC8, supplied by Hamamatsu Photonics K.K.). The results are indicated in "curing initiation time (sec)" in Tables 3 and 4. This evaluation was performed to evaluate curability while defining an index of the time point at which curing begins as the time point at which the phase angle begins to change (the time point at which the phase angle begins to decrease from 90 degrees) in the viscoelastic measurement. A shorter time as measured above indicates a shorter time from UV irradiation to the initiation of the curing reaction.

Gel Point

Each of the curable compositions (those including the photo-cationic polymerization initiator) obtained in the examples and comparative examples was irradiated with an ultraviolet ray (UV), and the time from the beginning of UV irradiation until the phase angle reached 45 degrees was measured using a viscoelastometer (trade name MCR301, supplied by Anton Paar Japan K.K.) and a UV irradiator (trade name LC8, supplied by Hamamatsu Photonics K.K.). The point at a phase angle of 45 degrees corresponds to the intersection of the storage elastic modulus G' and the loss elastic modulus G''. The results are indicated as "gel point (sec)" in Tables 3 and 4. This evaluation was performed to evaluate curability while defining an index for the gel point as the time point at which the phase angle becomes 45 degrees in the viscoelastic measurement. A shorter time as measured above indicates a shorter time to reach the gel point and a faster progress of the curing reaction.

Bending Strength, Bending Strain, and Product of Bending Strength and Bending Strain Each of the cured products obtained in the examples and comparative examples was subjected to bending strength and bending strain measurements using a tensile/compression tester (trade name RTF1350, supplied by A & D Company, Limited) in conformity with JIS K7171. In addition, the measured bending strength was multiplied by the bending strain to calculate a "product of bending strength and bending strain". This corresponds to fracture energy. In the measurements, test specimens of a size of 20 mm long by 2.5 mm wide by 1 mm high were used.

Glass Transition Temperature: Tg

Each of the cured products obtained in the examples and comparative examples was subjected to a glass transition temperature measurement. The measurement was performed after a pretreatment each using a differential scanning calorimeter (trade name Q2000, supplied by TA Instruments). In the pretreatment, the temperature was raised from −50° C. up to 250° C. at a rate of 20° C. per minute, and allowed to fall from 250° C. down to −50° C. at a rate of −20° C. per minute. The measurement was performed at measurement temperatures in the range of from −50° C. up to 250° C. at a rate of temperature rise of 20° C. per minute in a nitrogen stream.

Linear Expansion Coefficient

Each of the cured products obtained in the examples and comparative examples was subjected to a linear expansion coefficient measurement using a thermomechanical analyzer (trade name TMA/SS100, supplied by SII NanoTechnology Inc.). In the measurement, the thermal expansion coefficient of each sample was measured at measurement temperatures in the range of from 30° C. to 250° C. at a rate of temperature rise of 5° C. per minute to plot a thermal expansion curve, and the gradient of the thermal expansion curve was defined and indicated as the linear expansion coefficient. Linear expansion coefficients α1 and α2 are linear expansion coefficients (ppm/° C.) respectively at temperatures equal to or lower than the glass transition temperature and at temperatures equal to or higher than the glass transition temperature.

Internal Transmittance

The internal transmittance of each of the cured products obtained in the examples and comparative examples was calculated according to formulae as follows:

Internal transmittance at 400 nm=(Light transmittance at 400 nm)/$(1-r)^2$ $r=\{(n-1)/(n+1)\}^2$ The light transmittance at 400 nm was measured using a spectrophotometer (trade name U-3900, supplied by Hitachi High-Technologies Corporation). In the formula, n represents the refractive index at 400 nm and employs herein a refractive index at 400 nm as measured according to a method below. In addition, an internal transmittance at 450 nm was also calculated by the procedure as above.

Storage Elastic Modulus

The storage elastic modulus (GPa) of each of the cured products obtained in the examples and comparative examples was determined at 25° C. by a viscoelastic measurement in conformity with JIS K7244-4 under measurement conditions as follows.

Measurement Conditions

Measurement instrument: Dynamic mechanical analysis (RSA-III, supplied by TA Instruments)
Atmosphere: Nitrogen
Temperature range: −30° C. to 270° C.
Rate of temperature rise: 5° C. per minute Refractive Index Of each of the cured products obtained in the examples and comparative examples, the refractive index for light with a wavelength of 589 nm was measured at 25° C. using a refractometer (trade name Model 2010, supplied by Metricon Corporation) by a method in conformity with JIS K7142.

Abbe Number

The Abbe number of each of the cured products obtained in the examples and comparative examples was calculated according to the formula:

Abbe number=$(n_d-1)/(n_f-n_c)$ where $n_d$ represents a refractive index for light with a wavelength of 589.2 nm; $n_f$ represents a refractive index for light with a wavelength of 486.1 nm; and $n_c$ represents a refractive index for light with a wavelength of 656.3 nm. The refractive indices employed refractive indices for light with the individual wavelengths as measured according to the above-mentioned method.

Rate of Yellowing

Each of the cured products obtained in the examples and comparative examples was subjected to a heat resistance test (heat proof test) three times successively. The test was performed using a table-top reflow oven (supplied by SHI-NAPEC CO., LTD.) based on a reflow temperature profile (highest temperature: 270° C.) described in JEDEC Standards. The sample cured product after the heat resistance test was subjected to measurements of light transmittance and refractive indices at 400 nm and at 450 nm, thereby the internal transmittance of the cured product after the heat resistance test was determined, and the rate of yellowing (%) was determined based on the change in internal transmittance between before and after the heat resistance test according to the formula:

Rate of yellowinq (%)={(Internal transmittance before heat resistance test)−(Internal transmittance after heat resistance test)}/(Internal transmittance before heat resistance test)×100

The evaluation results are collectively indicated in Tables 3 and 4.

TABLE 3

| | Evaluation items | Ex. 1-1 | Ex. 1-2 | Ex. 1-3 | Ex. 1-4 | Ex. 1-5 | Ex. 1-6 | Ex. 1-7 | Ex. 1-8 |
|---|---|---|---|---|---|---|---|---|---|
| | Warping after annealing | absence | absence | absence | absence | absence | absence | absence | absence |
| Thermal curability | Conversion (%) after primary curing | 94 | — | 88 | 89 | 88 | — | — | — |
| | Conversion (%) after secondary curing | 97 | — | 95 | 95 | 96 | — | — | — |
| | Exothermic onset temperature (° C.) | 93 | — | 92 | 90 | 93 | — | — | — |
| UV curability | Time (sec) to Storage elastic modulus of 1 × $10^4$ Pa | — | 18 | — | — | — | 20 | 17 | 16 |
| | Curing initiation time (sec) | — | 9 | — | — | — | 8 | 9 | 9 |
| | Gel point (sec) | — | 14 | — | — | — | 25 | 19 | 12 |
| Mechanical properties | Tg (° C.) | 165-170 | 170-175 | 165 | 154 | 150 | 168 | 171 | 148 |
| | Coefficient of thermal expansion α1 | 82 | 79 | 95 | 91 | 105 | 109 | 107 | 129 |

TABLE 3-continued

| | | | | | | | | | |
|---|---|---|---|---|---|---|---|---|---|
| | Coefficient of thermal expansion α2 | | 97 | 118 | 104 | 96 | 117 | 119 | 117 | 144 |
| | Storage elastic modulus (GPa, 25° C.) | | 2.50 | 2.60 | 2.19 | 2.27 | 2.17 | 2.10 | 2.10 | 1.80 |
| | Bending strength (MPa, 25° C.) | | 105 | 110 | 108 | 103 | 103 | 120 | 108 | 92 |
| | Bending strain (% GL, 25° C.) | | 3.9 | 4.2 | 3.0 | 2.9 | 3.6 | 4.5 | 3.4 | 4.2 |
| | Product of bending strength and bending strain (MPa × % GL) | | 410 | 462 | 318 | 299 | 371 | 541 | 363 | 388 |
| Cured product before heat resistance test | Internal transmittance (%) | 400 nm | 97.9 | 94.9 | 99.0 | 99.2 | 99.0 | 95.2 | 95.0 | 95.0 |
| | | 450 nm | 99.4 | 99.6 | 100.0 | 100.0 | 100.0 | 100.0 | 100.0 | 99.4 |
| | Refractive index | | 1.5060 | 1.5081 | 1.5118 | 1.5095 | 1.5077 | 1.5098 | 1.5097 | 1.5041 |
| | Abbe number | | 55.9 | 55.9 | 57.3 | 56.1 | 55.0 | 56.5 | 56.4 | 56.1 |
| Cured product after heat resistance test | Internal transmittance (%) | 400 nm | 97.6 | 94.6 | 98.5 | 98.7 | 98.7 | 94.5 | 93.7 | 94.2 |
| | | 450 nm | 99.2 | 99.5 | 100.0 | 100.0 | 100.0 | 99.8 | 99.5 | 98.7 |
| | Rate of yellowing (%) | 400 nm | 0.3 | 0.3 | 0.6 | 0.5 | 0.3 | 0.7 | 1.4 | 0.9 |
| | | 450 nm | 0.2 | 0.1 | 0.3 | 0.0 | 0.0 | 0.2 | 0.5 | 0.8 |

| | Evaluation items | | Com. Ex. 1-1 | Com. Ex. 1-2 | Com. Ex. 1-3 | Com. Ex. 1-4 | Com. Ex. 1-5 | Com. Ex. 1-6 | Com. Ex. 1-7 |
|---|---|---|---|---|---|---|---|---|---|
| | Warping after annealing | | absence | absence | absence | absence | absence | absence | absence |
| Thermal curability | Conversion (%) after primary curing | | 92 | — | 91 | 94 | 89 | — | — |
| | Conversion (%) after secondary curing | | 97 | — | 98 | 97 | 96 | — | — |
| | Exothermic onset temperature (° C.) | | 89 | — | 94 | 92 | 90 | — | — |
| UV curability | Time (sec) to Storage elastic modulus of 1 × 10$^4$ Pa | | — | 29 | — | — | — | 25 | 35 |
| | Curing initiation time (sec) | | — | 6 | — | — | — | 7 | 8 |
| | Gel point (sec) | | — | 63 | — | — | — | 69 | *1 |
| Mechanical properties | Tg (° C.) | | 150-155 | 160-165 | 137 | 164 | 187 | 177 | 177 |
| | Coefficient of thermal expansion α1 | | 105 | 93 | 130 | 125 | 118 | 97 | 107 |
| | Coefficient of thermal expansion α2 | | 134 | 126 | 164 | 140 | 140 | 105 | 109 |
| | Storage elastic modulus (GPa, 25° C.) | | 2.50 | 2.10 | 2.42 | 2.50 | 2.45 | 2.42 | 2.52 |
| | Bending strength (MPa, 25° C.) | | 63 | 78 | 73 | 88 | 76 | 80 | 77 |
| | Bending strain (% GL, 25° C.) | | 3.2 | 2.8 | 3.1 | 2.7 | 2.9 | 2.6 | 2.5 |
| | Product of bending strength and bending strain (MPa × % GL) | | 202 | 218 | 226 | 238 | 220 | 208 | 193 |
| Cured product before heat resistance test | Internal transmittance (%) | 400 nm | 95.4 | 90.1 | 99.7 | 99.5 | 99.2 | 94.7 | 94.9 |
| | | 450 nm | 97.0 | 95.2 | 100.0 | 100.0 | 100.0 | 100.0 | 100 |
| | Refractive index | | 1.5098 | 1.5108 | 1.5166 | 1.5180 | 1.5160 | 1.5160 | 1.5149 |
| | Abbe number | | 55.7 | 55.4 | 56.6 | 57.3 | 56.8 | 55.8 | 55.4 |
| Cured product after heat resistance test | Internal transmittance (%) | 400 nm | 95.1 | 89.8 | 99.2 | 99.0 | 98.8 | 94.2 | 93.9 |
| | | 450 nm | 96.5 | 94.9 | 99.9 | 99.9 | 100.0 | 99.3 | 99.1 |
| | Rate of yellowing (%) | 400 nm | 0.3 | 0.3 | 0.5 | 0.5 | 0.4 | 0.5 | 1.1 |
| | | 450 nm | 0.5 | 0.3 | 0.1 | 0.1 | 0.0 | 0.6 | 0.9 |

*1: There was no intersection point between G' and G".

TABLE 4

| | Evaluation items | Ex. 2-1 | Ex. 2-2 | Ex. 2-3 | Ex. 2-4 | Ex. 2-5 | Ex. 2-6 | Ex. 2-7 | Ex. 2-8 |
|---|---|---|---|---|---|---|---|---|---|
| Moldability | Release properties | good | good | good | good | good | good | good | good |
| | Lens positional deviation | 0.3 | 0.4 | 0.4 | 0.4 | 0.5 | 0.5 | 0.4 | 0.3 |
| | Warping after annealing | absence | absence | absence | absence | absence | absence | absence | absence |
| Thermal curability | Conversion (%) after primary curing | 94 | — | 88 | 89 | 88 | — | — | — |
| | Conversion (%) after secondary curing | 97 | — | 95 | 95 | 96 | — | — | — |
| | Exothermic onset temperature (° C.) | 93 | — | 92 | 90 | 93 | — | — | — |
| UV curability | Time (sec) to Storage elastic modulus of 1 × 10$^4$ Pa | — | 18 | — | — | — | 20 | 17 | 16 |
| | Curing initiation (sec) | — | 9 | — | — | — | 8 | 9 | 9 |
| | Gel point (sec) | — | 14 | — | — | — | 25 | 19 | 12 |
| Mechanical properties | Tg (° C.) | 165-170 | 170-175 | 165 | 154 | 150 | 168 | 171 | 148 |
| | Coefficient of thermal expansion α1 | 82 | 79 | 95 | 91 | 105 | 109 | 107 | 129 |
| | Coefficient of thermal expansion α2 | 97 | 118 | 104 | 96 | 117 | 119 | 117 | 144 |
| | Storage elastic modulus (GPa, 25° C.) | 2.50 | 2.60 | 2.19 | 2.27 | 2.17 | 2.10 | 2.10 | 1.80 |

TABLE 4-continued

| | Evaluation items | | Com. Ex. 2-1 | Com. Ex. 2-2 | Com. Ex. 2-3 | Com. Ex. 2-4 | Com. Ex. 2-5 | Com. Ex. 2-6 | Com. Ex. 2-7 |
|---|---|---|---|---|---|---|---|---|---|
| | Bending strength(MPa, 25° C.) | | 105 | 110 | 108 | 103 | 103 | 120 | 108 | 92 |
| | Bending strain (% GL, 25° C.) | | 3.9 | 4.2 | 3.0 | 2.9 | 3.6 | 4.5 | 3.4 | 4.2 |
| | Product of bending strengh and bending strain (MPa × % GL) | | 410 | 462 | 318 | 299 | 371 | 541 | 363 | 388 |
| Cured product before heat resistance test | Internal transmittance (%) | 400 nm | 97.9 | 94.9 | 99.0 | 99.2 | 99.0 | 95.2 | 95.0 | 95.0 |
| | | 450 nm | 99.4 | 99.6 | 100.0 | 100.0 | 100.0 | 100.0 | 100.0 | 99.4 |
| | Refractive index | | 1.5060 | 1.5081 | 1.5118 | 1.5095 | 1.5077 | 1.5098 | 1.5097 | 1.5041 |
| | Abbe number | | 55.9 | 55.9 | 57.3 | 56.1 | 55.0 | 56.5 | 56.4 | 56.1 |
| Cured product after heat resistance test | Internal transmittance (%) | 400 nm | 97.6 | 94.6 | 98.5 | 98.7 | 98.7 | 94.5 | 93.7 | 94.2 |
| | | 450 nm | 99.2 | 99.5 | 100.0 | 100.0 | 100.0 | 99.8 | 99.5 | 98.7 |
| | Rate of yellowing (%) | 400 nm | 0.3 | 0.3 | 0.6 | 0.5 | 0.3 | 0.7 | 1.4 | 0.9 |
| | | 450 nm | 0.2 | 0.1 | 0.3 | 0.0 | 0.0 | 0.2 | 0.5 | 0.8 |

| | Evaluation items | | Com. Ex. 2-1 | Com. Ex. 2-2 | Com. Ex. 2-3 | Com. Ex. 2-4 | Com. Ex. 2-5 | Com. Ex. 2-6 | Com. Ex. 2-7 |
|---|---|---|---|---|---|---|---|---|---|
| Moldability | Release properties | | fair | fair | fair | good | fair | good | good |
| | Lens positional deviation | | 1.1 | 0.9 | 1.3 | 1.0 | 0.9 | 0.9 | 1.1 |
| | Warping after annealing | | absence | absence | absence | absence | absence | absence | absence |
| Thermal curability | Conversion (%) after primary curing | | 92 | — | 91 | 94 | 89 | — | — |
| | Conversion (%) after secondary curing | | 97 | — | 98 | 97 | 96 | — | — |
| | Exothermic onset temperature (° C.) | | 89 | — | 94 | 92 | 90 | — | — |
| UV curability | Time (sec) to Storage elastic modulus of $1 \times 10^4$ Pa | | — | 29 | — | — | — | 25 | 35 |
| | Curing initiation (sec) | | — | 6 | — | — | — | 7 | 8 |
| | Gel point (sec) | | — | 63 | — | — | — | 69 | *1 |
| Mechanical properties | Tg (° C.) | | 150-155 | 160-165 | 137 | 164 | 187 | 177 | 177 |
| | Coefficient of thermal expansion α1 | | 105 | 93 | 130 | 125 | 118 | 97 | 107 |
| | Coefficient of thermal expansion α2 | | 134 | 126 | 164 | 140 | 140 | 105 | 109 |
| | Storage elastic modulus (GPa, 25° C.) | | 2.50 | 2.10 | 2.42 | 2.50 | 2.45 | 2.42 | 2.52 |
| | Bending strength(MPa, 25° C.) | | 63 | 78 | 73 | 88 | 76 | 80 | 77 |
| | Bending strain (% GL, 25° C.) | | 3.2 | 2.8 | 3.1 | 2.7 | 2.9 | 2.6 | 2.5 |
| | Product of bending strengh and bending strain (MPa × % GL) | | 202 | 218 | 226 | 238 | 220 | 208 | 193 |
| Cured product before heat resistance test | Internal transmittance (%) | 400 nm | 95.4 | 90.1 | 99.7 | 99.5 | 99.2 | 94.7 | 94.9 |
| | | 450 nm | 97.0 | 95.2 | 100.0 | 100.0 | 100.0 | 100.0 | 100 |
| | Refractive index | | 1.5098 | 1.5108 | 1.5166 | 1.5180 | 1.5160 | 1.5160 | 1.5149 |
| | Abbe number | | 55.7 | 55.4 | 56.6 | 57.3 | 56.8 | 55.8 | 55.4 |
| Cured product after heat resistance test | Internal transmittance (%) | 400 nm | 95.1 | 89.8 | 99.2 | 99.0 | 98.8 | 94.2 | 93.9 |
| | | 450 nm | 96.5 | 94.9 | 99.9 | 99.9 | 100.0 | 99.3 | 99.1 |
| | Rate of yellowing (%) | 400 nm | 0.3 | 0.3 | 0.5 | 0.5 | 0.4 | 0.5 | 1.1 |
| | | 450 nm | 0.5 | 0.3 | 0.1 | 0.1 | 0.0 | 0.6 | 0.9 |

*1: There was no intersection point between G' and G".

INDUSTRIAL APPLICABILITY

The curable composition [1] according to the present invention is preferably usable as a material for optical element formation (as a composition for optical element formation). The curable composition [2] according to the present invention is a curable composition that is suitable for the formation of a wafer-level lens (as a curable composition for a wafer-level lens).

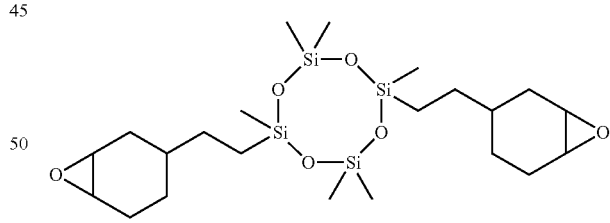

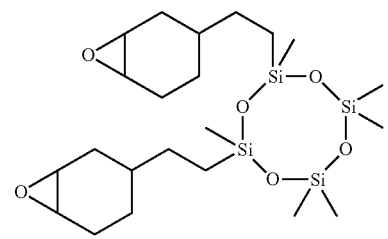

The invention claimed is:

1. A curable composition comprising:

a cycloaliphatic epoxide (A);

a siloxane (B) comprising at least two epoxy groups per molecule;

a curing agent (C);

an oxetane compound; and a hydrogenated glycidyl ether epoxide;

wherein the siloxane (B) is one or more compounds represented by the following formulae:

-continued

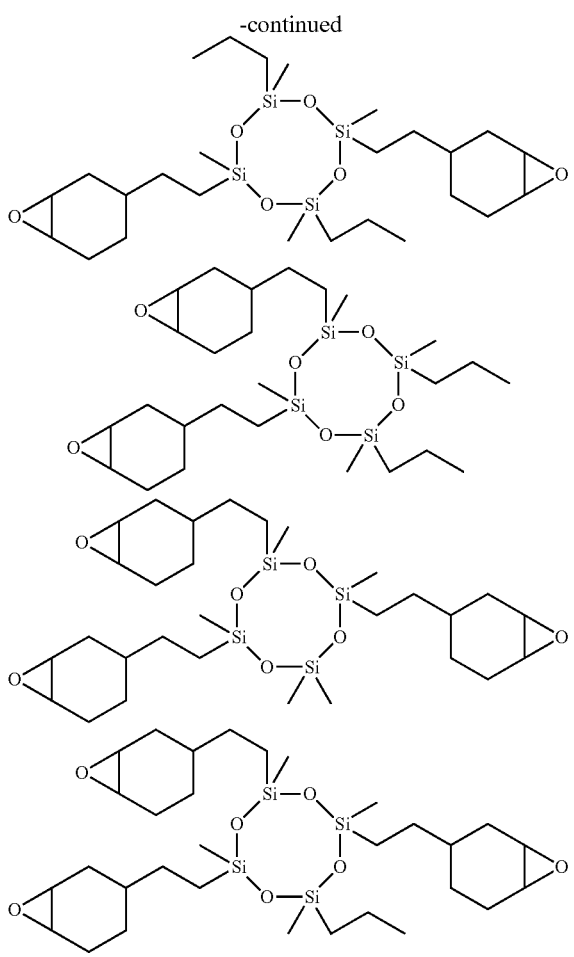

and

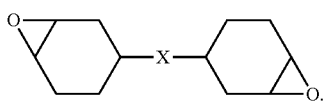

2. The curable composition according to claim 1,
wherein the cycloaliphatic epoxide (A) comprises a compound represented by Formula (I):
wherein X is selected from a single bond and a linkage group.

(I)

3. The curable composition according to claim 1,
wherein the siloxane (B) comprising at least two epoxy groups per molecule comprises a cycloaliphatic epoxy group as at least one of the epoxy groups.

4. The curable composition according to claim 1,
wherein the curable composition comprises the cycloaliphatic epoxide (A) in a content of from 5 to 60 percent by weight based on the total amount (100 percent by weight) of the curable composition.

5. The curable composition according to claim 1,
wherein the cycloaliphatic epoxide (A) comprises 3,4,3',4'-diepoxybicyclohexyl.

6. A cured product of the curable composition according to claim 1.

7. An optical element comprising
a cured product of the curable composition according to claim 6.

8. An optical device comprising
the optical element according to claim 7.

9. A method for producing a wafer-level lens, the method comprising subjecting a curable composition to one of cast molding and injection molding,
wherein the curable composition comprises:
a cycloaliphatic epoxide (A);
a siloxane (B) comprising at least two epoxy groups per molecule;
a curing agent (C);
an oxetane compound; and
a hydrogenated glycidyl ether epoxide;
wherein the siloxane (B) is one or more compounds represented by the following formulae:

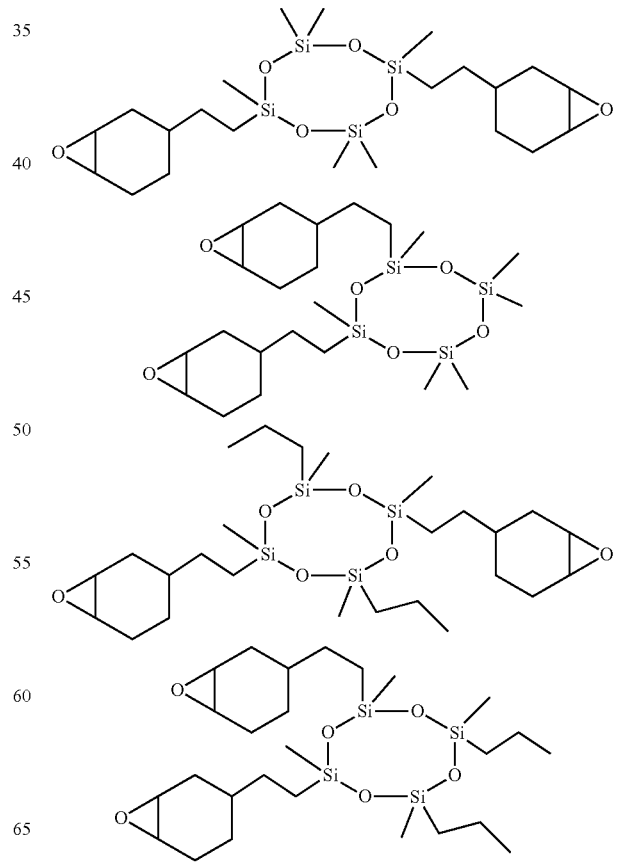

-continued

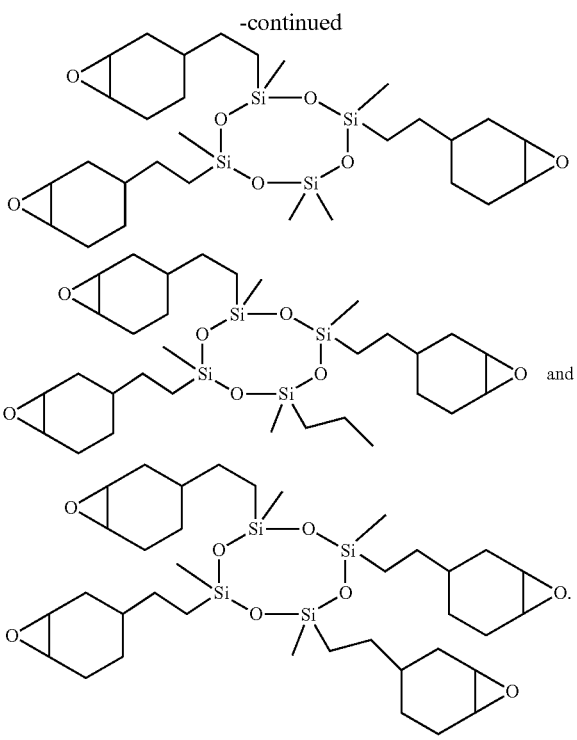

and

10. The method for producing a wafer-level lens, according to claim 9, wherein a cast molding or an injection molding comprises the steps of:
   1a or 1b) preparing a wafer-level-lens mold comprising at least one lens pattern;
   2a or 2b) bringing or injecting the curable composition for a wafer-level lens into contact with the wafer-level-lens mold; and
   3a or 3b) applying at least one of heat and light to the curable composition for a wafer-level lens to cure the curable composition to thereby give a cured product of the curable composition.

11. The method for producing a wafer-level lens, according to claim 10,
   wherein the cast molding or the injection molding further comprises, after the step 3a or 3b), the step of
   4a or 4b) annealing the cured product of the curable composition for a wafer-level lens.

12. The method for producing a wafer-level lens, according to claim 10,
   wherein the cast molding further comprises, after the step 3a), the step of
   5a) cutting the cured product of the curable composition for a wafer-level lens.

13. A wafer-level-lens sheet obtained by the method for producing a wafer-level lens according to claim 9.

14. A wafer-level lens obtained by the method for producing a wafer-level lens according to claim 9.

15. An optical device comprising
   the wafer-level lens according to claim 14.

16. A wafer-level lens stack comprising
   a plurality of wafer-level lenses,
   the plurality of wafer-level lenses constituting the stack comprising
      a wafer-level lens obtained by curing and molding the curable composition for a wafer-level lens according to claim 1.

17. A method for producing a wafer-level lens stack, the method comprising the steps of:
   1c) preparing a wafer-level-lens mold comprising at least one lens pattern;
   2c) bringing the curable composition according to claim 1 into contact with the wafer-level-lens mold;
   3c) applying at least one of heat and light to the curable composition for a wafer-level lens to cure the curable composition to thereby give a wafer-level-lens sheet;
   4c) stacking a plurality of wafer-level-lens sheets comprising the wafer-level-lens sheet to give a wafer-level-lens sheet stack; and
   5c) cutting the wafer-level-lens sheet stack to give the wafer-level lens stack according to claim 16.

18. The method for producing a wafer-level lens stack, according to claim 17, the method further comprising, between the step 3c) and the step 4c), the step of
   6c) annealing the wafer-level-lens sheet.

19. The method for producing a wafer-level lens, according to claim 9,
   wherein the cycloaliphatic epoxide (A) comprises a compound represented by Formula (I):

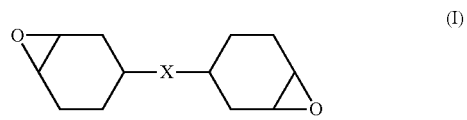

wherein X is selected from a single bond and a linkage group.

20. The curable composition according to claim 1,
   wherein the content of the hydrogenated glycidyl ether epoxide is 5 to 40 percent by weight based on the total amount (100 percent by weight) of curable compounds contained in the curable composition.

* * * * *